United States Patent
Higashiyama et al.

(10) Patent No.: US 10,673,320 B2
(45) Date of Patent: Jun. 2, 2020

(54) SNUBBER CIRCUIT AND POWER CONVERSION SYSTEM INCLUDING SAME

(71) Applicant: PANASONIC INTELLECTUAL PROPERTY MANAGEMENT CO., LTD., Osaka (JP)

(72) Inventors: Koji Higashiyama, Osaka (JP); Fumito Kusama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/468,220

(22) PCT Filed: Dec. 8, 2017

(86) PCT No.: PCT/JP2017/044107
§ 371 (c)(1),
(2) Date: Jun. 10, 2019

(87) PCT Pub. No.: WO2018/110440
PCT Pub. Date: Jun. 21, 2018

(65) Prior Publication Data
US 2019/0334430 A1     Oct. 31, 2019

(30) Foreign Application Priority Data
Dec. 12, 2016   (JP) .................... 2016-240510

(51) Int. Cl.
*H02M 1/34*     (2007.01)
*H02M 3/335*    (2006.01)
*H02M 7/5387*   (2007.01)

(52) U.S. Cl.
CPC ......... *H02M 1/34* (2013.01); *H02M 3/33584* (2013.01); *H02M 7/5387* (2013.01); *H02M 2001/342* (2013.01)

(58) Field of Classification Search
CPC .. H02M 1/34; H02M 7/5387; H02M 3/33584; H02M 2001/342
See application file for complete search history.

(56) References Cited

U.S. PATENT DOCUMENTS 5,923,153 A *   7/1999   Liu .................... H02M 3/158
                                                       323/222
6,341,076 B1 *  1/2002   Kadatskyy ............ H02M 1/34
                                                      363/56.09
(Continued)

FOREIGN PATENT DOCUMENTS

CN      103 441 677 B    9/2015
JP      2013-128373 A    6/2013
(Continued)

OTHER PUBLICATIONS

International Search Report and Written Opinion issued in International Patent Application No. PCT/JP2017/044107, dated Jan. 9, 2018; with partial English translation.
(Continued)

*Primary Examiner* — Kyle J Moody
(74) *Attorney, Agent, or Firm* — McDermott Will & Emery LLP

(57) ABSTRACT

When a magnitude of a voltage between a pair of first voltage points in a main circuit exceeds a first clamp value, a first clamp circuit absorbs electrical energy of the main circuit from the pair of first voltage points to clamp the voltage to the first clamp value. When a magnitude of a voltage between a pair of second voltage points in the main circuit falls below a second clamp value, a second clamp circuit injects electrical energy to the main circuit from the pair of second voltage points to clamp the voltage to the second clamp value. A voltage conversion circuit performs voltage conversion between a first clamp voltage defining a (Continued)

first clamp value and a second clamp voltage defining a second clamp value.

10 Claims, 12 Drawing Sheets

(56) References Cited

U.S. PATENT DOCUMENTS

| | | | |
|---|---|---|---|
| 7,023,186 B2 | 4/2006 | Yan | |
| 7,049,793 B2* | 5/2006 | Itoh | H02M 3/158 323/222 |
| 7,233,507 B2* | 6/2007 | Schenk | H02M 1/34 323/222 |
| 7,330,018 B2* | 2/2008 | Huber | H02M 1/34 323/220 |
| 7,486,055 B2* | 2/2009 | Yamashita | H02M 3/158 323/222 |
| 8,593,116 B2* | 11/2013 | Rivet | H02M 3/155 323/225 |
| 8,912,768 B1* | 12/2014 | Cho | H02M 3/156 323/222 |
| 9,065,357 B2* | 6/2015 | Tabata | H02M 7/538 |
| 9,350,192 B2* | 5/2016 | Lee | H02J 7/022 |
| 2007/0236187 A1 | 10/2007 | Wai et al. | |
| 2009/0086520 A1 | 4/2009 | Nishimura | |
| 2009/0154204 A1* | 6/2009 | Taylor | H02M 3/33592 363/52 |
| 2014/0104889 A1 | 4/2014 | Yamada et al. | |
| 2014/0117872 A1 | 5/2014 | Finley | |

FOREIGN PATENT DOCUMENTS

| | | |
|---|---|---|
| JP | 2013-158064 A | 8/2013 |
| JP | 2014-079144 A | 5/2014 |
| WO | 2007/122849 A1 | 11/2007 |
| WO | 2013/076752 A1 | 5/2013 |

OTHER PUBLICATIONS

Subiyanto, et al., "Prototype Development of an Intelligent Power Conditioning Unit for PV Generation System," Industrial Technology (ICIT), 2013 International Conference on IEEE, IEEE, Feb. 25, 2013 (Feb. 25, 2013), pp. 758-763.

Extended European Search Report dated Nov. 28, 2019, issued in corresponding European Patent Application No. 17882036.1.

* cited by examiner

SNUBBER CIRCUIT AND POWER CONVERSION SYSTEM INCLUDING SAME

CROSS-REFERENCE OF RELATED APPLICATIONS

This application is the U.S. National Phase under 35 U.S.C. § 371 of International Patent Application No. PCT/JP2017/044107, filed on Dec. 8, 2017, which in turn claims the benefit of Japanese Application No. 2016-240510, filed on Dec. 12, 2016, the entire disclosures of which Applications are incorporated by reference herein.

TECHNICAL FIELD

The present disclosure generally relates to snubber circuits and power conversion systems including the snubber circuits, and specifically to a snubber circuit for suppressing a ringing or surge voltage and a power conversion system including the snubber circuit.

BACKGROUND ART

Patent Literature 1 describes a snubber circuit used in a power conversion system such as an alternating-current/direct-current power converter.

In Patent Literature 1, an AC/AC frequency converter connected to a primary side of a high-frequency transformer includes a three-phase rectifier, an inverter, and a snubber circuit. The three-phase rectifier has an input side connected to a three-phase commercial AC power supply and an output side connected to an input side of the inverter. The input side of the inverter is connected to the output side of the three-phase rectifier, and an output side of the inverter is connected to the primary side of the high-frequency transformer. The snubber circuit is connected between the three-phase rectifier and the inverter.

The snubber circuit described in Patent Literature 1 absorbs, as energy, a spike-like overvoltage caused due to leakage inductance of the high-frequency transformer and regenerates the energy absorbed. The snubber circuit is an RCD single direction snubber circuit of regenerative type including a resistor, a capacitor, a diode, and a semiconductor switch.

In the RCD single direction snubber circuit as described in Patent Literature 1, at least part of the energy absorbed is converted into heat and consumed by the resistor. Thus, as electric power to be converted by the power conversion system increases, loss in the snubber circuit increases.

CITATION LIST

Patent Literature

Patent Literature 1: JP 2013-158064 A

SUMMARY OF INVENTION

In view of the foregoing, it is an object of the present disclosure to provide a snubber circuit configured to suppress loss to a low level and a power conversion system including the snubber circuit.

A snubber circuit of a first aspect includes a first clamp circuit, a second clamp circuit, and a voltage conversion circuit. The first clamp circuit is configured to, when a magnitude of a voltage between a pair of first voltage points in a main circuit exceeds a first clamp value, absorb electrical energy of the main circuit from the pair of first voltage points. Thus, the first clamp circuit clamps the voltage between the pair of first voltage points to the first clamp value. The second clamp circuit is configured to, when a magnitude of a voltage between a pair of second voltage points in the main circuit falls below a second clamp value, inject electrical energy to the main circuit from the pair of second voltage points. Thus, the second clamp circuit clamps the voltage between the pair of second voltage points to the second clamp value. The voltage conversion circuit is electrically connected to the first clamp circuit and the second clamp circuit and is configured to perform voltage conversion between a first clamp voltage and a second clamp voltage. The first clamp voltage defines the first clamp value. The second clamp voltage defines the second clamp value.

In a snubber circuit of a second aspect referring to the first aspect, one first voltage point of the pair of first voltage points is located on a high-potential side, one second voltage point of the pair of second voltage points is located on the high-potential side, and a potential at the one first voltage point is equal to a potential at the one second voltage point. In this case, the other first voltage point of the pair of first voltage points is located on a low-potential side, the other second voltage point of the pair of second voltage points is located on the low-potential side, and a potential at the other first voltage point is equal to a potential at the other second voltage point. The voltage conversion circuit is configured to step down the first clamp voltage to generate the second clamp voltage.

In a snubber circuit of a third aspect referring to the first or second aspect, the voltage conversion circuit is a DC/DC converter including a semiconductor switch, an inductor, and a capacitive element. In this case, the capacitive element is electrically connected in parallel to at least one of the semiconductor switch and the inductor.

In a snubber circuit of a fourth aspect referring to any one of the first to third aspects, the first clamp circuit includes a first diode and a first capacitive element which are electrically connected in series between the pair of first voltage points. In this case, the first clamp circuit is configured to, when the voltage between the pair of first voltage points exceeds the first clamp value, cause a current to flow from the main circuit through the first diode to the first capacitive element. The second clamp circuit includes a second diode and a second capacitive element which are electrically connected in series between the pair of second voltage points. In this case, the second clamp circuit is configured to, when the voltage between the pair of second voltage points falls below the second clamp value, cause a current to flow from the second capacitive element through the second diode to the main circuit.

In a snubber circuit of a fifth aspect referring to any one of the first to fourth aspects, the voltage conversion circuit is a DC/DC converter including a semiconductor switch and an inductor. In this case, the voltage conversion circuit is configured to cause the semiconductor switch to perform switching operation such that an inductor current flowing through the inductor is in a discontinuous mode.

In a snubber circuit of a sixth aspect referring to any one of the first to fifth aspects, the voltage conversion circuit is a DC/DC converter including a semiconductor switch, an inductor, and a control circuit configured to control the semiconductor switch. In this case, the control circuit is configured to adjust a duty ratio of the semiconductor switch to adjust the first clamp value and the second clamp value.

A power conversion system of a seventh aspect includes the snubber circuit of any one of the first to sixth aspects, and the main circuit. The main circuit being a power conversion circuit configured to convert electric power.

In a power conversion system of an eighth aspect referring to the seventh aspect, the main circuit includes two or more primary-side terminals, two or more secondary-side terminals, and a high-frequency insulated transformer. In this case, the main circuit is configured to convert electric power between a set of the two or more primary-side terminals and a set of the two or more secondary-side terminals via the high-frequency insulated transformer.

In a power conversion system of an ninth aspect referring to the eighth aspect, the snubber circuit is electrically connected to the high-frequency insulated transformer.

DESCRIPTION OF EMBODIMENTS (1) Schema

First, a schema of a snubber circuit according to the present embodiment and a power conversion system including the snubber circuit will be described with reference to FIG. 1.

A power conversion system 1 includes a main circuit 2 and a snubber circuit 3. The main circuit 2 is a power conversion circuit configured to convert electric power. The snubber circuit 3 is a protection circuit configured to control a ringing or surge voltage generated by the main circuit 2. When the main circuit 2 converts, for example, direct-current power into alternating-current power or the alternating-current power into the direct-current power, ringing may occur due to leakage inductance of a transformer which will be described later. The power conversion system 1 according to the present embodiment enables such ringing to be suppressed by the snubber circuit 3. The snubber circuit 3 corresponds to a sub-circuit with respect to the main circuit 2.

Figure 1:
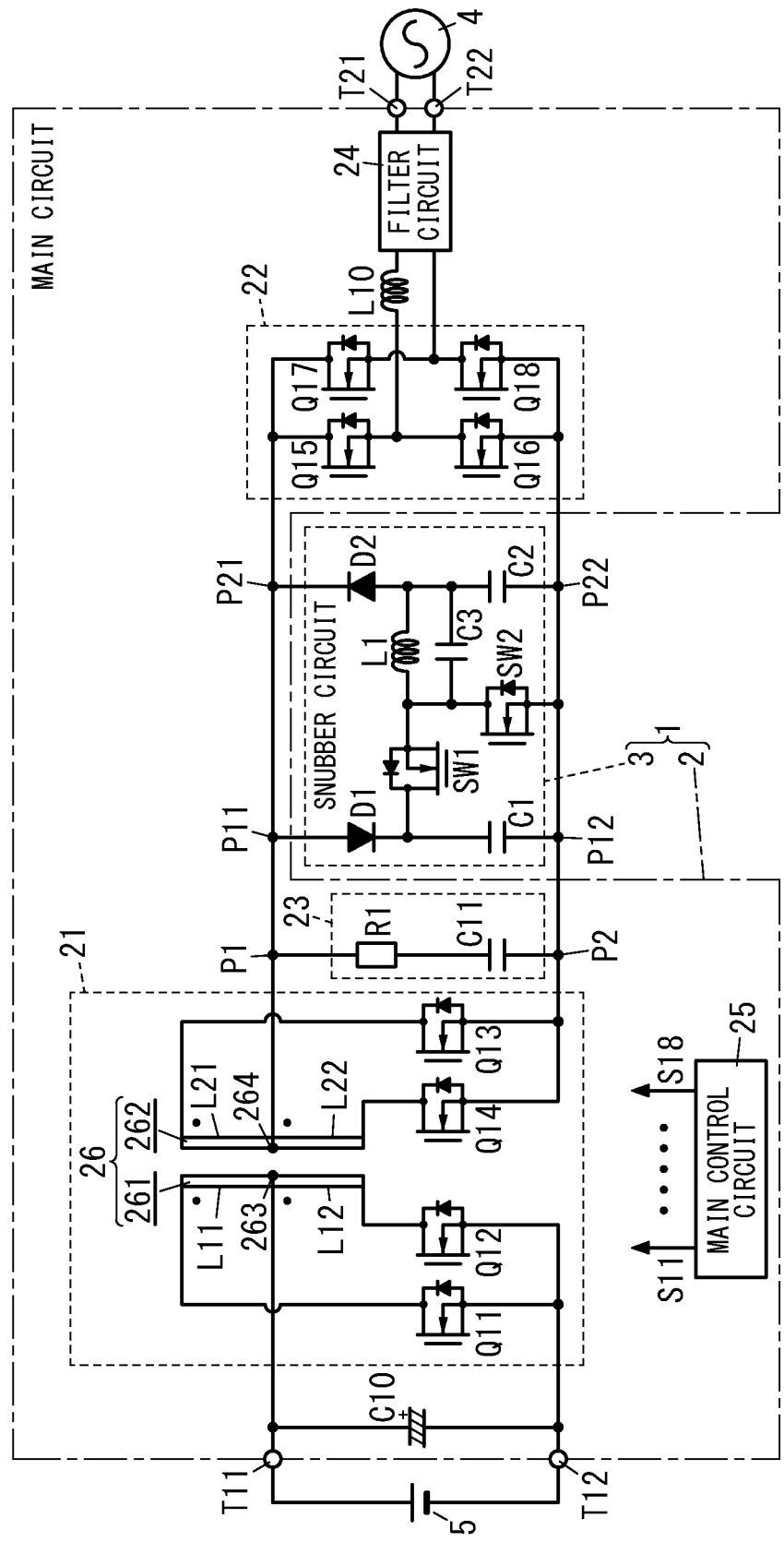
FIG. 1 is a circuit diagram illustrating a power conversion system of an embodiment of the present disclosure.

The power conversion system 1 is used for electric power conversion, for example, between a power system 4 and a storage battery 5 as illustrated in FIG. 1. As used herein, the term "power system" means an entire system based on which an electricity supplier such as an electric power company supplies electric power to a power receiving facility of a consumer. In the example shown in FIG. 1, the power conversion system 1 includes a pair of primary-side terminals T11 and T12 to which the storage battery 5 is electrically connected and a pair of secondary-side terminals T21 and T22 to which the power system 4 is electrically connected. The power conversion system 1 converts alternating-current power input from the power system 4 into direct-current power and supplies the direct-current power to the storage battery 5 so as to charge the storage battery 5. The power conversion system 1 converts direct-current power input from the storage battery 5 into alternating-current power and outputs the alternating-current power to the power system 4 so as to discharge the storage battery 5.

In the present embodiment, the power conversion system 1 is configured to bidirectionally convert electric power between the pair of primary-side terminals T11 and T12 and the pair of secondary-side terminals T21 and T22 so as to be compatible with both charging and discharging of the storage battery 5. Thus, the power conversion system 1 connects and systematically links the storage battery 5 to the power system 4 to enable the storage battery 5 to be charged with electric power supplied from the power system 4 and/or to enable a load connected to the power system 4 to be supplied with discharged electric power of the storage battery 5. In the present embodiment, for example, a description is given of a case where a power storage system including the power conversion system 1 and the storage battery 5 is introduced into a non-dwelling facility such as an office building, a hospital, a commercial facility, or a school.

(2) Configuration (2.1) Configuration of Main Circuit

First, a configuration of the main circuit 2 which, together with the snubber circuit 3, forms the power conversion system 1 will be described with reference to FIG. 1.

The main circuit 2 includes the pair of primary-side terminals T11 and T12, the pair of secondary-side terminals T21 and T22, a capacitor C10, a first converter 21, a second converter 22, an RC snubber 23, a filter circuit 24, a main control circuit 25, and an inductor L10.

In the example shown in FIG. 1, the storage battery 5 is electrically connected between the pair of primary-side terminals T11 and T12 such that the primary-side terminal T11 is located on a high-potential (positive-electrode) side. Moreover, the power system 4 is electrically connected between the pair of secondary-side terminals T21 and T22. Note that as used herein, the term "terminal" does not have to be a component for connecting an electric wire and the like but may be, for example, a lead of an electronic component or part of a conductor included in a circuit board.

The capacitor C10 is, in this embodiment, an electrolytic capacitor and is electrically connected between the pair of primary-side terminals T11 and T12. The capacitor C10 has a function of stabilizing a voltage between the pair of primary-side terminals T11 and T12.

The RC snubber 23 includes a resistor R1 and a capacitor C11. The resistor R1 and the capacitor C11 are electrically connected in series between a pair of bus voltage points P1 and P2. The snubber circuit 3 is electrically connected between the pair of bus voltage points P1 and P2, which will be described later in detail. While the main circuit 2 operates, a bus voltage Vbus which is a direct-current voltage is generated between the pair of bus voltage points P1 and P2.

The first converter 21 is electrically connected between the capacitor C10 and the RC snubber 23. The first converter 21 includes a transformer 26 and first to fourth switching elements Q11 to Q14. The first converter 21 serves as an insulating DC/DC converter located between the capacitor C10 and the RC snubber 23 and configured to convert a direct-current voltage. In the present embodiment, for example, each of the first to fourth switching elements Q11 to Q14 is an n-channel depletion Metal-Oxide-Semiconductor Field Effect Transistor (MOSFET).

The transformer 26 includes a primary winding wire 261 and a secondary winding wire 262 which are magnetically connected to each other. The transformer 26 is a high-frequency insulated transformer equipped with a center tap. The primary winding wire 261 includes a series circuit of two winding wires L11 and L12 with a primary side center tap 263 as a connection point. Similarly, the secondary winding wire 262 includes a series circuit of two winding wires L21 and L22 with a secondary side center tap 264 as a connection point. The primary side center tap 263 is electrically connected to a positive electrode-side terminal (the primary-side terminal T11) of the capacitor C10. The secondary side center tap 264 is electrically connected to the bus voltage point P1 of the pair of bus voltage points P1 and P2 which is on a high-potential side. In the present embodiment, for example, the winding turns ratio of the winding wires L11, L12, L21, and L22 is 1:1:1:1.

The first switching element Q11 is electrically connected in series to the winding wire L11 between both ends of the capacitor C10. The second switching element Q12 is electrically connected in series to the winding wire L12 between both the ends of the capacitor C10. In other words, between the pair of primary-side terminals T11 and T12, a series circuit of the winding wire L11 and the first switching element Q11 and a series circuit of the winding wire L12 and the second switching element Q12 are electrically connected in parallel. Specifically, the drain of the first switching element Q11 is electrically connected to the primary side center tap 263 via the winding wire L11, and the drain of the second switching element Q12 is electrically connected to the primary side center tap 263 via the winding wire L12. The source of the first switching element Q11 and the source of the second switching element Q12 are both electrically connected to a negative electrode-side terminal (the primary-side terminal T12) of the capacitor C10.

The third switching element Q13 is electrically connected in series to the winding wire L21 between both ends of the RC snubber 23. The fourth switching element Q14 is electrically connected in series to the winding wire L22 between both the ends of the RC snubber 23. In other words, between the pair of bus voltage points P1 and P2, a series circuit of the winding wire L21 and the third switching element Q13 and a series circuit of the winding wire L22 and the fourth switching element Q14 are electrically connected in parallel. Specifically, the drain of the third switching element Q13 is electrically connected to the secondary side center tap 264 via the winding wire L21, and the drain of the fourth switching element Q14 is electrically connected to the secondary side center tap 264 via the winding wire L22. The source of the third switching element Q13 and the source of the fourth switching element Q14 are both electrically connected to the bus voltage point P2 of the pair of bus voltage points P1 and P2 which is on a low-potential side.

The second converter 22 is electrically connected between the RC snubber 23 and the pair of secondary-side terminals T21 and T22. The second converter 22 includes fifth to eighth switching elements Q15 to Q18. The second converter 22 serves as a DC/AC converter (inverter) located between the RC snubber 23 and the filter circuit 24 and configured to convert the direct-current voltage into an alternating-current voltage, or the alternating-current voltage into the direct-current voltage. In the present embodiment, for example, each of the fifth to eighth switching elements Q15 to Q18 is an n-channel depletion MOSFET.

The fifth to eighth switching elements Q15 to Q18 are connected in a full-bridge configuration. That is, between both the ends of the RC snubber 23, the fifth switching element Q15 is electrically connected in series to the sixth switching element Q16. Between both the ends of the RC snubber 23, the seventh switching element Q17 is electrically connected in series to the eighth switching element Q18. In other words, between the pair of bus voltage points P1 and P2, a series circuit of the fifth switching element Q15 and the sixth switching element Q16 is electrically connected in parallel to a series circuit of the seventh switching element Q17 and the eighth switching element Q18. Specifically, the drain of the fifth switching element Q15 and the drain of the seventh switching element Q17 are both electrically connected to the bus voltage point P1 of the pair of bus voltage points P1 and P2 which is on the high-potential side. The source of the sixth switching element Q16 and the source of the eighth switching element Q18 are both electrically connected to the bus voltage point P2 of the pair of bus voltage points P1 and P2 which is on the low-potential side.

The filter circuit 24 is electrically connected between the second converter 22 and the pair of secondary-side terminals T21 and T22. Specifically, the filter circuit 24 has a pair of terminals facing the second converter 22, and one of the pair of terminals is electrically connected via the inductor L10 to a connection point of the source of the fifth switching element Q15 and the drain of the sixth switching element Q16. The filter circuit 24 has the pair of terminals facing the second converter 22, and the other of the pair of terminals is electrically connected to a connection point of the source of the seventh switching element Q17 and the drain of the eighth switching element Q18. The filter circuit 24 has a pair of terminals facing the secondary-side terminals T21 and T22 and electrically connected to the pair of secondary-side terminals T21 and T22. In other words, the second converter 22 is electrically connected via the inductor L10 and the filter circuit 24 to the pair of secondary-side terminals T21 and T22.

The main control circuit 25 outputs control signals S11 to S18 for controlling the first to eighth switching elements Q11 to Q18. The control signals S11 to S18 are respectively applied to the gates of the first to eighth switching elements Q11 to Q18 directly or via a drive circuit so as to individually turn on/off the first to eighth switching elements Q11 to Q18. The main control circuit 25 controls the first to eighth switching elements Q11 to Q18 based on a Pulse Width Modulation (PWM) system which enables the duty ratio to be adjusted. The main control circuit 25 includes, for example, a microcomputer including a Central Processing Unit (CPU), a Field-Programmable Gate Array (FPGA), or Application Specific Integrated Circuit (ASIC).

(2.2) Configuration of Snubber Circuit

Figure 2A:
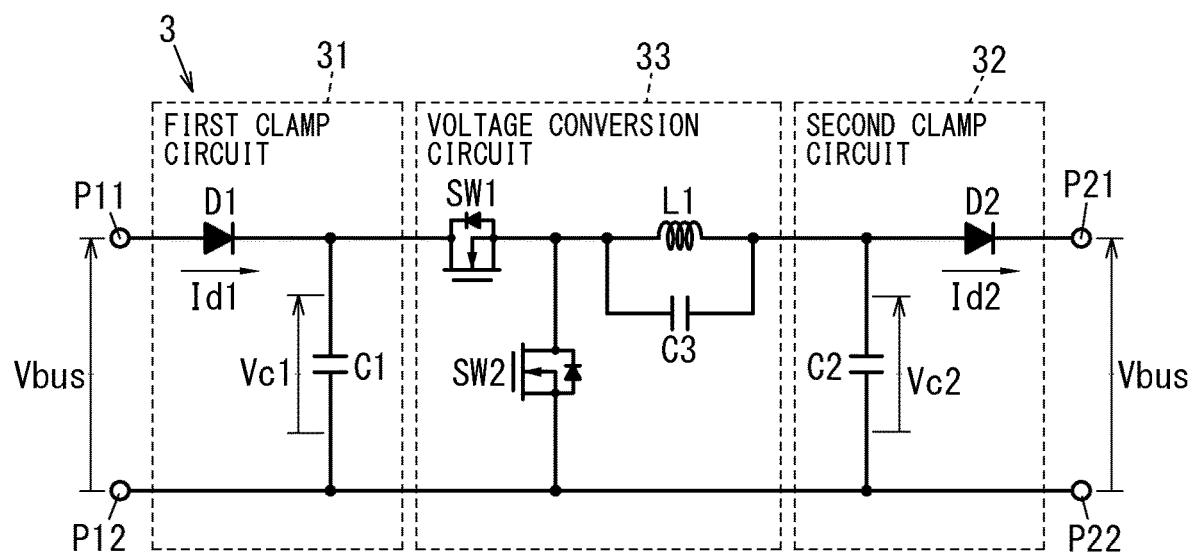
FIG. 2A is a circuit diagram illustrating a snubber circuit of the embodiment of the present disclosure.

Next, a configuration of the snubber circuit 3 will be described with reference to FIGS. 1, 2A, and 2B. FIG. 2A shows the snubber circuit 3 of FIG. 1, wherein disposition of each elements in the circuit diagram is changed. The snubber circuit 3 shown in FIG. 2A is equivalent to the snubber circuit 3 shown in FIG. 1.

As illustrated in FIG. 1, the snubber circuit 3 is electrically connected to a pair of first voltage points P11 and P12 of the main circuit 2 and a pair of second voltage points P21 and P22 of the main circuit 2. That is, the main circuit 2 includes the pair of first voltage points P11 and P12 and the pair of second voltage points P21 and P22 electrically connected to the snubber circuit 3.

In the present embodiment, the pair of first voltage points P11 and P12 is directly connected to the pair of bus voltage points P1 and P2. Moreover, the pair of second voltage points P21 and P22 is directly connected to the pair of bus voltage points P1 and P2. In sum, the first voltage point P11 on the high-potential side, the second voltage point P21, and the bus voltage point P1 are electrically equivalent points at the same potential. Similarly, the first voltage point P12 on the low-potential side, the second voltage point P22, and the bus voltage point P2 are electrically equivalent points at the same potential. The pair of first voltage points P11 and P12 and the pair of second voltage points P21 and P22 are each denoted by a terminal symbol for circuit diagram in FIG. 2A but do not necessarily have to be components (terminals) for connecting electric wires and the like.

Figure 2B:
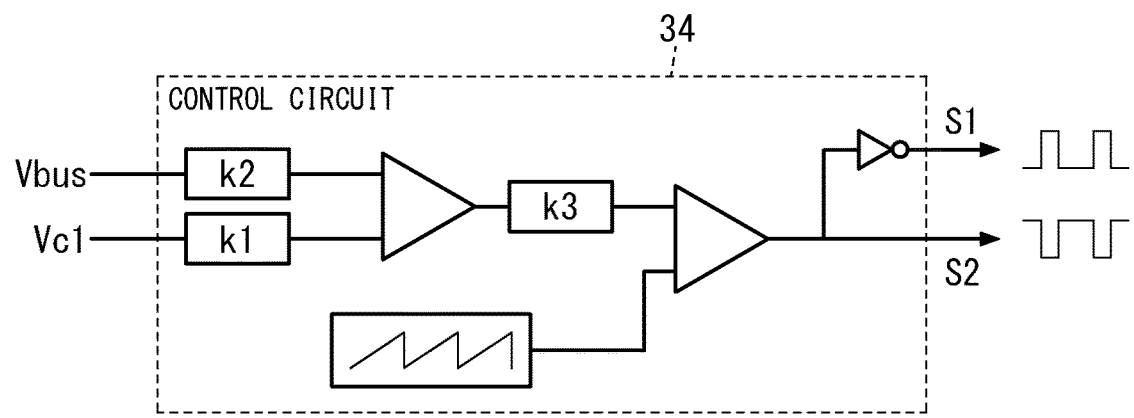
FIG. 2B is a block diagram illustrating a control circuit of the snubber circuit.

As illustrated in FIGS. 2A and 2B, the snubber circuit 3 includes a first clamp circuit 31, a second clamp circuit 32, a voltage conversion circuit 33, and a control circuit 34 (see FIG. 2B).

The first clamp circuit 31 is a circuit configured to, when the magnitude of the voltage (bus voltage Vbus) between the pair of first voltage points P11 and P12 in the main circuit 2 exceeds a first clamp value v1 (see FIG. 3B), absorb electrical energy of the main circuit 2 from the pair of first voltage points P11 and P12. Thus, the first clamp circuit 31 clamps the voltage between the pair of first voltage points P11 and P12 to the first clamp value v1. That is, when the bus voltage Vbus of the main circuit 2 exceeds the first clamp value v1, the first clamp circuit 31 extracts, from the main circuit 2, electrical energy exceeding the first clamp value v1, thereby clamping an upper limit value of the bus voltage Vbus to the first clamp value v1.

The first clamp circuit 31 includes a first diode D1 and a first capacitive element C1 (capacitor). The first diode D1 and the first capacitive element C1 are electrically connected in series between the pair of first voltage points P11 and P12. The first clamp circuit 31 is configured to, when the voltage (bus voltage Vbus) between the pair of first voltage points P11 and P12 exceeds the first clamp value v1, cause a current Id1 to flow from the main circuit 2 through the first diode D1 to the first capacitive element C1. Specifically, the first diode D1 has an anode electrically connected to the first voltage point P11 on the high-potential side. The first diode D1 has a cathode electrically connected via the first capacitive element C1 to the first voltage point P12 on the low-potential side.

In this configuration, it is assumed that the magnitude of the voltage across the first capacitive element C1 corresponds to the first clamp value v1, and in this case, when the bus voltage Vbus between the pair of first voltage points P11 and P12 exceeds the first clamp value v1, the first diode D1 is turned on and the current Id1 flows through the first capacitive element C1. In a precise sense, a voltage obtained by adding a forward direction drop voltage of the first diode D1 to the voltage across the first capacitive element C1 corresponds to the first clamp value v1. Note that the forward direction drop voltage of the first diode D1 is sufficiently smaller than the first clamp value v1, and therefore, the present embodiment is described assuming that the forward direction drop voltage of the first diode D1 is zero, that is, the magnitude of the voltage across the first capacitive element C1 corresponds to the first clamp value v1.

The second clamp circuit 32 is a circuit configured to, when the magnitude of the voltage (bus voltage Vbus) between the pair of second voltage points P21 and P22 in the main circuit 2 falls below a second clamp value v2 (see FIG. 3), inject electrical energy to the main circuit 2 from the pair of second voltage points P21 and P22. Thus, the second clamp circuit 32 clamps the voltage between the pair of second voltage points P21 and P22 to the second clamp value v2. That is, when the bus voltage Vbus of the main circuit 2 falls below the second clamp value v2, the second clamp circuit 32 regenerates electrical energy corresponding to a difference between the bus voltage Vbus and the second clamp value v2 in the main circuit 2, thereby clamping a lower limit value of the bus voltage Vbus to the second clamp value v2.

The second clamp circuit 32 includes a second diode D2 and a second capacitive element C2 (capacitor). The second diode D2 and the second capacitive element C2 are electrically connected in series between the pair of second voltage points P21 and P22. The second clamp circuit 32 is configured to, when the voltage (bus voltage Vbus) between the pair of second voltage points P21 and P22 falls below the second clamp value v2, cause a current Id2 to flow from the second capacitive element C2 through the second diode D2 to the main circuit 2. Specifically, the second diode D2 has a cathode electrically connected to the second voltage point P21 on the high-potential side. The second diode D2 has an anode electrically connected via the second capacitive element C2 to the second voltage point P22 on the low-potential side.

In this configuration, it is assumed that the magnitude of the voltage across the second capacitive element C2 corresponds to the second clamp value v2, and in this case, when the bus voltage Vbus between the pair of second voltage points P21 and P22 falls below the second clamp value v2, the second diode D2 is turned on and the current Id2 flows through the second capacitive element C2. In a precise sense, a voltage obtained by adding a forward direction drop voltage of the second diode D2 to the voltage across the second capacitive element C2 corresponds to the second clamp value v2. Note that the forward direction drop voltage of the second diode D2 is sufficiently smaller than the second clamp value v2, and therefore, the present embodiment is described assuming that the forward direction drop voltage of the second diode D2 is zero, that is, the magnitude of the voltage across the second capacitive element C2 corresponds to the second clamp value v2.

As illustrated in FIG. 2A, the voltage conversion circuit 33 is electrically connected to the first clamp circuit 31 and the second clamp circuit 32. The voltage conversion circuit 33 performs voltage conversion (step-down, step-up, or step-up and down) between a first clamp voltage Vc1 and a second clamp voltage Vc2. As used herein, the term "first clamp voltage" is a voltage defining the first clamp value v1 and is, in the present embodiment, the voltage across the first capacitive element C1. The term "second clamp voltage" is a voltage defining the second clamp value v2 and is, in the present embodiment, the voltage across the second capacitive element C2.

The voltage conversion circuit 33 is a chopper-type DC/DC converter including a first switch SW1 as a semiconductor switch and an inductor L1. In the present embodiment, for example, the voltage conversion circuit 33 is a step-down (chopper) circuit and steps down the first clamp voltage Vc1 to generate the second clamp voltage Vc2. That is, the voltage conversion circuit 33 steps down the voltage across the first capacitive element C1 to generate the voltage across the second capacitive element C2.

Specifically, the voltage conversion circuit 33 includes a second switch SW2 and a capacitive element C3 (capacitor) in addition to the first switch SW1 and the inductor L1. In the present embodiment, for example, each of the first switch SW1 and the second switch SW2 is an n-channel depletion MOSFET.

The first switch SW1 and the second switch SW2 are electrically connected in series between both ends of the first capacitive element C1. The drain of the first switch SW1 is electrically connected to the cathode of the first diode D1 of the first clamp circuit 31. The source of the second switch SW2 is electrically connected to the negative electrode-side terminal (the first voltage point P12) of the first capacitive element C1.

The inductor L1 is electrically connected in series to the second switch SW2 between both ends of the second capacitive element C2. In other words, the inductor L1 is electrically connected between a connection point of the source of the first switch SW1 and the drain of the second switch SW2 and the anode of the second diode D2 of the second clamp circuit 32.

The capacitive element C3 is electrically connected in parallel to the inductor L1 between a connection point of the source of the first switch SW1 and the drain of the second switch SW2 and the anode of the second diode D2 of the second clamp circuit 32. The capacitive element C3 is provided to realize soft switching of the first switch SW1 and the second switch SW2, which will be described later in detail in "(3.3) soft switching".

As illustrated in FIG. 2B, the control circuit 34 outputs control signals S1 and S2 for respectively controlling the first switch SW1 and the second switch SW2. The control signals S1 and S2 are respectively applied to the gate of the first switch SW1 and the gate of the second switch SW2 directly or via a drive circuit to individually turn on/off the first switch SW1 and the second switch SW2. The control circuit 34 controls the first switch SW1 and the second switch SW2 based on the PWM system which enables the duty ratio to be adjusted. The control circuit 34 is an autonomous control circuit which performs feedback control by using an analog circuit. The control circuit 34 includes, for example, an FPGA or an ASIC.

In the example shown in FIG. 2B, the control circuit 34 determines the duty ratios of the control signals S1 and S2 based on the first clamp voltage Vc1 (the voltage across the first capacitive element C1) and the average value of the voltage (bus voltage Vbus) between the pair of second voltage points P21 and P22. That is, the control circuit 34 detects the first clamp voltage Vc1 and the bus voltage Vbus and inputs, to a comparator, a sawtooth wave and a value obtained by multiplying, by a coefficient (k3), a difference between values obtained by multiplying the first clamp voltage Vc1 and the bus voltage Vbus respectively by coefficients (k1, k2), thereby generating the control signals S1 and S2. Here, the control signal S1 and the control signal S2 are signals whose waveforms are inverted so that the first switch SW1 and the second switch SW2 are alternately turned on. Depending on the duty ratios of the control signals S1 and S2, the step-down ratio of the voltage conversion circuit 33 changes, which will also be described in detail in "(3.2) Operation of Snubber Circuit". Thus, the first clamp value v1 is automatically determined relative to an average value v0 (see FIG. 3B) of the bus voltage Vbus.

(3) Operation (3.1) Operation of Main Circuit

With reference to FIG. 1, operation of the main circuit 2 will be briefly described below.

In the present embodiment, the power conversion system 1 is, as described above, configured to bidirectionally convert electric power between the pair of primary-side terminals T11 and T12 and the pair of secondary-side terminals T21 and T22 via the transformer 26. Thus, the main circuit 2 has two operation modes, namely an "inverter mode" and a "converter mode". The inverter mode is an operation mode in which the direct-current power input to the pair of primary-side terminals T11 and T12 is converted into the alternating-current power to output the alternating-current power from the pair of secondary-side terminals T21 and T22.

The converter mode is an operation mode in which the alternating-current power input to the pair of secondary-side terminals T21 and T22 is converted into the direct-current power to output the direct-current power from the pair of primary-side terminals T11 and T12.

First, operation of the main circuit 2 in the inverter mode will be described. Here, it is assumed that the magnitude of the voltage between the pair of primary-side terminals T11 and T12, that is, the voltage across the capacitor C10 is "E".

The main control circuit 25 controls the first to fourth switching elements Q11 to Q14 of the first converter 21 such that a combination of the first and third switching elements Q11 and Q13 and a combination of the second and fourth switching elements Q12 and Q14 are alternately turned on. Here, the duty ratio of each of the first and third switching elements Q11 and Q13 (or second and fourth switching elements Q12 and Q14) is 50%. Here, when the first and third switching elements Q11 and Q13 are ON, a voltage −E is generated at both ends of the winding wire L21, and when the second and fourth switching elements Q12 and Q14 are ON, a voltage E is generated at both ends of the winding wire L22. Thus, the pair of bus voltage points P1 and P2 alternately receives the voltage E from the winding wire L21 and the winding wire L22.

During a time period during which voltages at the pair of bus voltage points P1 and P2 are fixed, the main control circuit 25 performs PWM control of the second converter 22, thereby controlling the output voltage of the second converter 22. Specifically, during a supply time period during which the fifth and eighth switching elements Q15 and Q18 (or sixth and seventh switching elements Q16 and Q17) are ON, a current is supplied from the winding wire L22 (or winding wire L21) through the second converter 22 to the pair of secondary-side terminals T21 and T22. On the other hand, during a circulation time period during which the fifth and seventh switching elements Q15 and Q17 (or sixth and eighth switching elements Q16 and Q18) are ON, a current from the inductor L10 flows through the second converter 22 as a return path. The main control circuit 25 changes a ratio of the supply time period to the circulation time period, thereby controlling the output voltage of the second converter 22. Inversion operation in the secondary winding wire 262 of the transformer 26 of the first converter 21 is performed during the circulation time period.

The main circuit 2 repeats the operation described above to convert direct-current power from the storage battery 5 into alternating-current power and outputs the alternating-current power from the pair of secondary-side terminals T21 and T22 to the power system 4.

Moreover, the main circuit 2 causes the first converter 21 and the second converter 22 to operate also in the converter mode based on a sequence basically similar to that in the inverter mode. That is, in the main circuit 2, when the output voltage of the second converter 22 is lower than the voltage of the power system 4, the alternating-current power from the power system 4 is converted into the direct-current power, which is output from the pair of primary-side terminals T11 and T12 to the storage battery 5.

Along with the operation of the main circuit 2 having such a configuration, ringing may be caused in the bus voltage Vbus, which is a direct-current voltage, generated at the pair of bus voltage points P1 and P2. That is, since the second converter 22 is connected via the transformer 26 to the storage battery 5 serving as a direct-current power supply, the second converter 22 may be deemed to be electrically connected via leakage inductance of the transformer 26 to the direct-current power supply (storage battery 5). Thus, when switching operation of the second converter 22 is performed, ringing may occur in the bus voltage Vbus.

(3.2) Operation of Snubber Circuit

Next, operation of the snubber circuit 3 will be described with reference to FIGS. 2A to 3B.

Figure 3A:
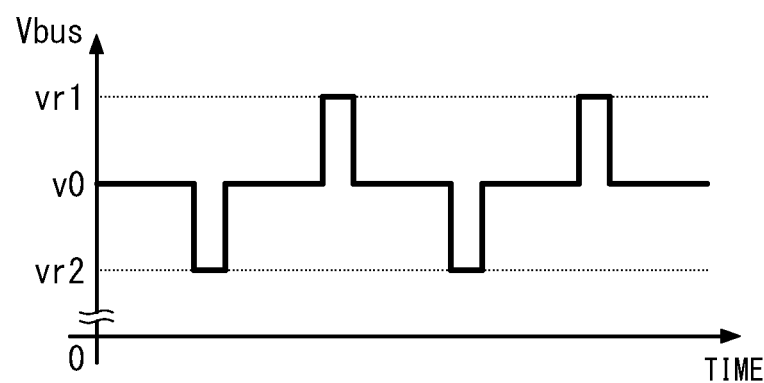
FIG. 3A is a waveform diagram illustrating a bus voltage in a case where the snubber circuit is not provided in the power conversion system.
Figure 3B:
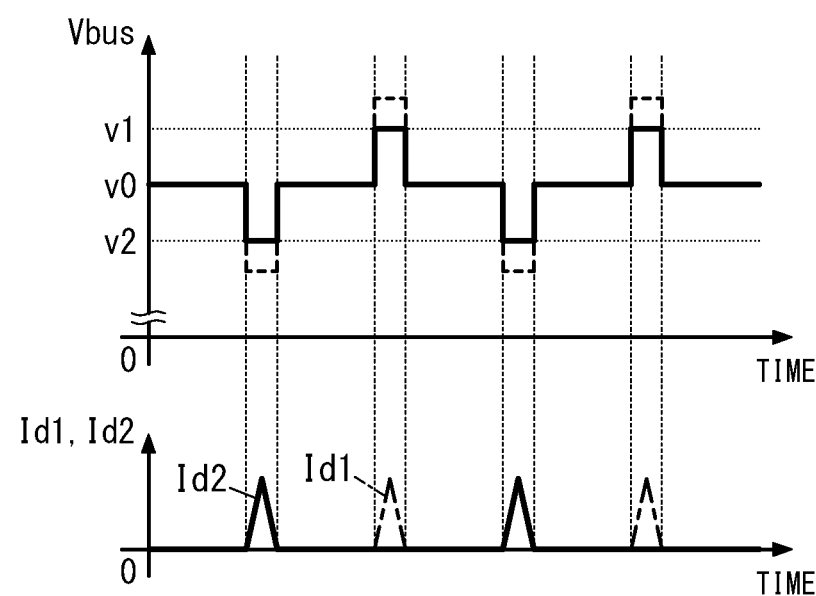
FIG. 3B is a waveform diagram illustrating a bus voltage and a current in a case where the snubber circuit is provided in the power conversion system.

In FIG. 3A, the bus voltage Vbus is shown with the horizontal axis being a time axis. In FIG. 3B, the bus voltage Vbus is shown in a graph in an upper section, and the currents Id1 and Id2 (see FIG. 2A) are shown in a graph in a lower section, where the horizontal axis is a time axis. The current Id1 represents a current flowing through the first diode D1 of the snubber circuit 3, and the current Id2 represents a current flowing through the second diode D2 of the snubber circuit 3. Moreover, in FIG. 3B, the bus voltage Vbus before being clamped is indicated by a broken line. In FIG. 3B, the current Id1 is indicated by a broken line, and the current Id2 is represented by a solid line.

First, a case without the snubber circuit 3 will be described. In this case, as illustrated in FIG. 3A, positive ringing and negative ringing may occur in the bus voltage Vbus, which is a direct-current voltage, generated at the pair of bus voltage points P1 and P2. As used herein, the term "positive ringing" means ringing in a direction (positive direction) in which the voltage increases (to "vr1" in FIG. 3A) with respect to the average value v0 of the bus voltage Vbus. The term "negative ringing" means ringing in a direction (negative direction) in which the voltage decreases (to "vr2" in FIG. 3A) with respect to the average value v0 of the bus voltage Vbus.

When the positive ringing occurs in the bus voltage Vbus, the snubber circuit 3 absorbs electrical energy of the main circuit 2 by using the first clamp circuit 31 to clamp the bus voltage Vbus to the first clamp value v1 as illustrated in FIG. 3B. That is, when as a result of the occurrence of the positive ringing in the bus voltage Vbus, the magnitude of the bus voltage Vbus exceeds the first clamp value v1, the first diode D1 is turned on, and the first clamp circuit 31 operates. At this time, as illustrated in FIG. 3B, as the electrical energy is absorbed by the first clamp circuit 31, the current Id1 having a pulse shape flows through the first diode D1. This enables the snubber circuit 3, when the magnitude of the bus voltage Vbus exceeds the first clamp value v1, to extract electrical energy corresponding to the electrical energy exceeding the first clamp value v1 from the main circuit 2 and accumulate the electrical energy in the first capacitive element C1. Thus, even when positive ringing occurs in the bus voltage Vbus, the maximum value of the bus voltage Vbus is suppressed to the first clamp value v1.

Moreover, the snubber circuit 3 performs voltage conversion between the first clamp voltage Vc1 and the second clamp voltage Vc2 by using the voltage conversion circuit 33 electrically connected between the first clamp circuit 31 and the second clamp circuit 32. The voltage conversion circuit 33 alternately turns on the first switch SW1 and the second switch SW2 based on the control signals S1 and S2 from the control circuit 34 to step-down the first clamp voltage Vc1, thereby generating the second clamp voltage Vc2. Thus, the value (second clamp value v2) of the voltage across the second capacitive element C2 as the second clamp voltage Vc2 is smaller than the value (first clamp value v1) of the voltage across the first capacitive element C1 as the first clamp voltage Vc1. In sum, when the first clamp circuit 31 operates and electrical energy is accumulated in the first capacitive element C1, at least part of the electrical energy is sent via the voltage conversion circuit 33 to the second capacitive element C2 of the second clamp circuit 32 and is accumulated in the second capacitive element C2.

Moreover, when the negative ringing occurs in the bus voltage Vbus, the snubber circuit 3 injects electrical energy to the main circuit 2 by using the second clamp circuit 32 to clamp the bus voltage Vbus to the second clamp value v2 as illustrated in FIG. 3B. That is, when as a result of the occurrence of the negative ringing in the bus voltage Vbus, the magnitude of the bus voltage Vbus falls below the second clamp value v2, the second diode D2 is turned on, and the second clamp circuit 32 operates. At this time, as illustrated in FIG. 3B, as the electrical energy is injected by the second clamp circuit 32, the current Id2 having a pulse shape flows through the second diode D2. Thus, when the magnitude of the bus voltage Vbus falls below the second clamp value v2, the snubber circuit 3 enables electrical energy corresponding to a difference between the bus voltage Vbus and the second clamp value v2 to be regenerated from the second capacitive element C2 in the main circuit 2. Thus, even when negative ringing occurs in the bus voltage Vbus, the minimum value of the bus voltage Vbus is suppressed to the second clamp value v2.

In this embodiment, as described above, the electrical energy accumulated in the second capacitive element C2 is electrical energy provided via the voltage conversion circuit 33 from the first capacitive element C1. That is, the snubber circuit 3 regenerates electrical energy absorbed from the main circuit 2 by using the first clamp circuit 31 at the occurrence of the positive ringing in the bus voltage Vbus from the second clamp circuit 32 in the main circuit 2 at the occurrence of the negative ringing in the bus voltage Vbus. Moreover, in other words, in the snubber circuit 3, the electrical energy absorbed at the occurrence of the positive ringing is stored once and is regenerated at the occurrence of the negative ringing. In this way, the electrical energy of the positive ringing which occurs in the bus voltage Vbus and the electrical energy of the negative ringing are canceled out each other, thereby reducing both the positive ringing and the negative ringing in the bus voltage Vbus.

Figure 4:
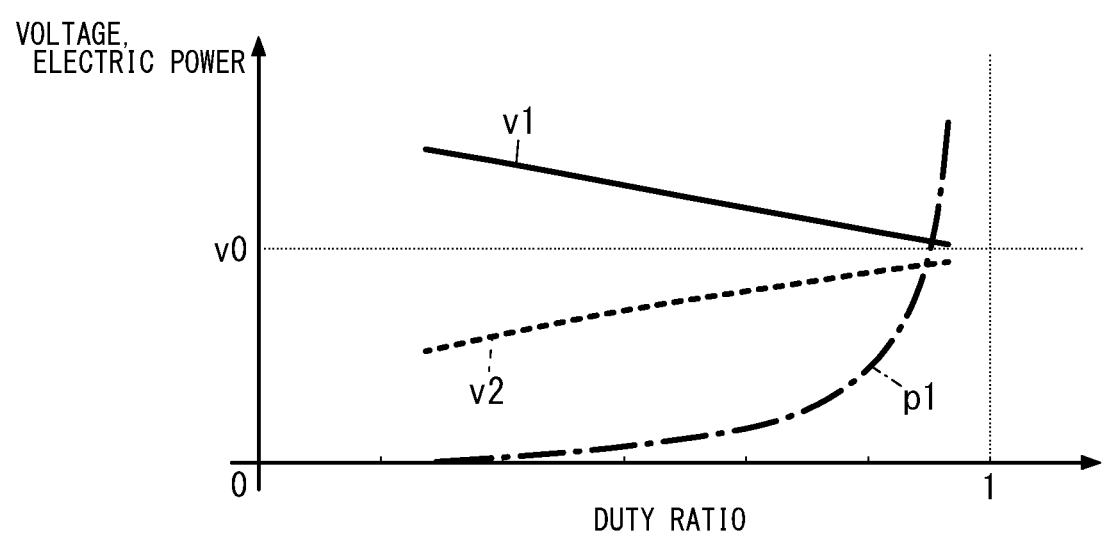
FIG. 4 is a characteristic view illustrating a relationship of a duty ratio to a voltage and electric power in a voltage conversion circuit of the snubber circuit.

In the snubber circuit 3 according to the present embodiment, adjusting the duty ratio of the control signal S1 for controlling the first switch SW1 enables the first clamp value v1 and the second clamp value v2 to be adjusted. That is, when the duty ratio of the control signal S1 changes, the step-down ratio of the voltage conversion circuit 33 changes, and therefore, along with this change, the first clamp value v1 and the second clamp value v2 also change. FIG. 4 is a graph showing a relationship of the duty ratio to the first clamp value v1 and the second clamp value v2 with the horizontal axis representing the duty ratio of the control signal S1. Moreover, FIG. 4 also shows a relationship between the duty ratio and the electric power regenerated by the snubber circuit 3 in the main circuit 2 (hereinafter referred to as a "regenerated electric power p1").

As can be seen from FIG. 4, as the duty ratio of the control signal S1 increases, that is, the ratio of the ON time period of the first switch SW1 in the switching cycle of the first switch SW1 increases, the first clamp value v1 decreases, and the second clamp value v2 increases. As the duty ratio of the control signal S1 approaches the maximum value "1", the first clamp value v1 and the second clamp value v2 approaches the average value v0 of the bus voltage Vbus. Note that the first clamp value v1 does not fall below the average value v0 of the bus voltage Vbus, and the second clamp value v2 does not exceed the average value v0 of the bus voltage Vbus. Moreover, as the duty ratio of the control signal S1 increases, the regenerated electric power p1 increases. In other words, as the duty ratio of the control signal S1 decreases, that is, the ratio of the ON time period of the first switch SW1 in the switching cycle of the first switch SW1 decreases, the first clamp value v1 increases, and the second clamp value v2 decreases. Moreover, as the duty ratio of the control signal S1 decreases, the regenerated electric power p1 decreases.

(3.3) Soft Switching

Figure 5:
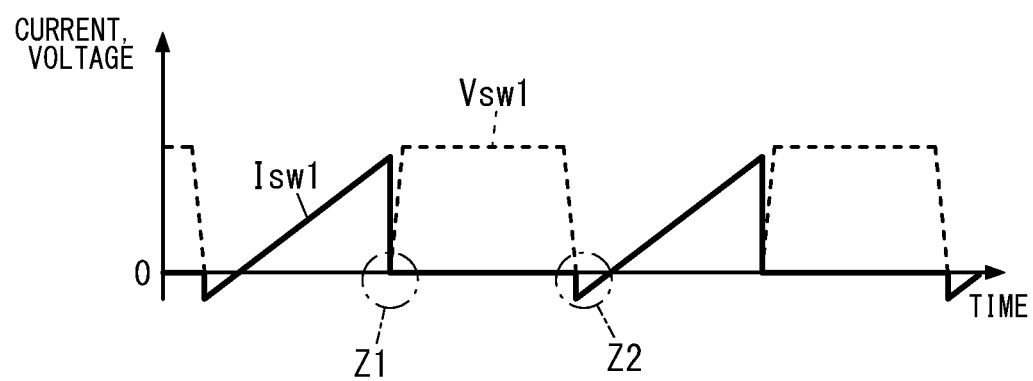
FIG. 5 is a waveform diagram illustrating a switch voltage and a switch current of the snubber circuit.

Examples of a condition for realizing soft switching of the first switch SW1 in the snubber circuit 3 include a first condition and a second condition. These conditions will be described below with reference to FIG. 5. FIG. 5 shows a voltage across the first switch SW1 (hereinafter referred to as a "switch voltage Vsw1") and a current flowing through the first switch SW1 (hereinafter referred to as a "switch current Isw1") with the horizontal axis being a time axis.

The first condition is that as an area Z2 shown in FIG. 5, at a timing of turning on the first switch SW1 (switching from an OFF state to an ON state), a current flowing through the inductor L1 (hereinafter referred to as an "inductor current IL"), that is, the switch current Isw1 falls to or below zero. In other words, the first condition is that the first switch SW1 performs switching operation such that the inductor current IL of the voltage conversion circuit 33 in the snubber circuit 3 flows according to the discontinuous mode. Thus the inductor current IL flows through the inductor L1 discontinuously according to the discontinuous mode. The first condition is realized by setting the circuit constant (inductance) of the inductor L1, which will be described later in detail.

The second condition is that as the area Z1 shown in FIG. 5, a rise of the switch current Isw1 does not intersect a rise of the switch voltage Vsw1. In other words, the second condition is that at a timing of turning off the first switch SW1 in the snubber circuit 3 (at a timing of switching from the ON state to the OFF state), the switch voltage Vsw1 does not rise while the switch current Isw1 is falling. The second condition is realized by setting the circuit constant (inductance) of the inductor L1 and the circuit constant (capacitance value) of the capacitive element C3 electrically connected in parallel to the inductor L1, which will be described later in detail.

Figure 6A:
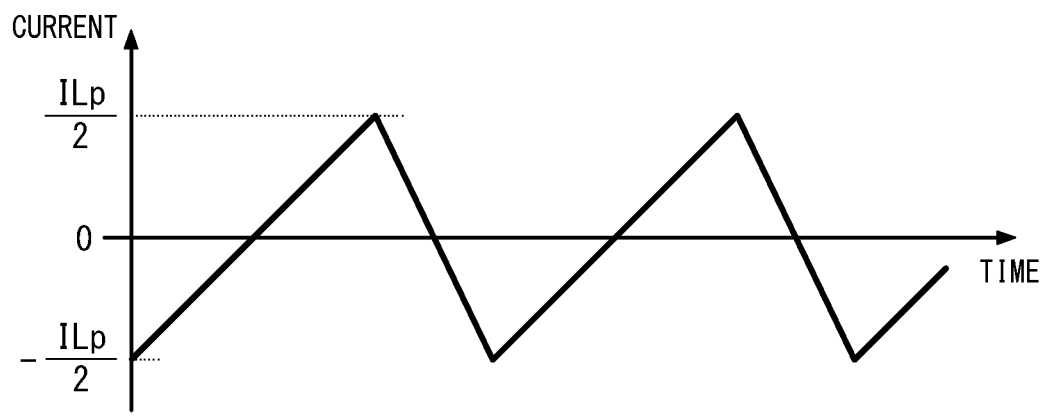
FIG. 6A is a waveform diagram illustrating an inductor current when the snubber circuit is not loaded.
Figure 6B:
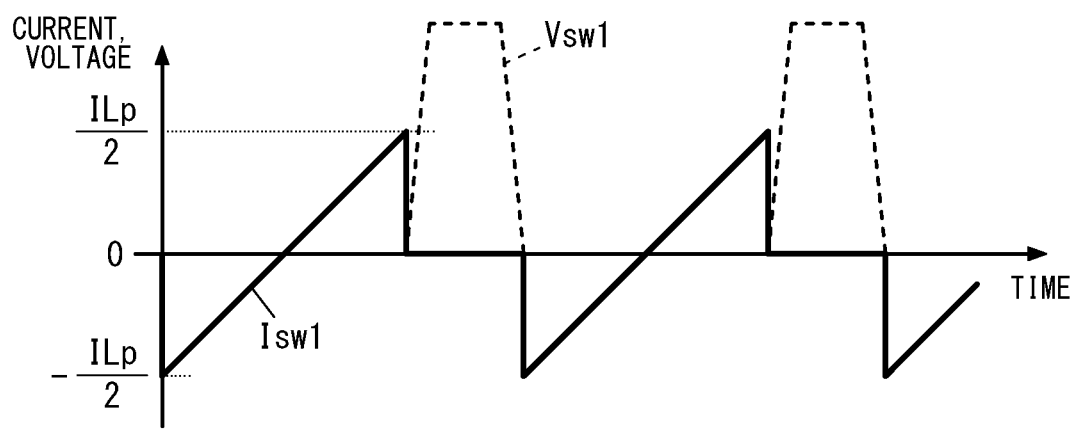
FIG. 6B is a waveform diagram illustrating the switch voltage and the switch current when the snubber circuit is not loaded.

First, the circuit constant of the inductor L1 for satisfying the first condition will be described. When the snubber circuit 3 is not loaded, that is, the current Id2 flowing through the second diode D2 is zero, the inductor current IL flowing through the inductor L1 vibrates with 0 A as the center along with switching of the first switch SW1 as illustrated in FIG. 6A. That is, in the inductor current IL, a ripple occurs with 0 A as the center. FIG. 6B shows the switch current Isw1 and the switch voltage Vsw1 in this case. At this time, an amplitude ILp at a peak to peak of the ripple in the inductor current IL is expressed in the expression [Formula 1] below.

$$ILp = \frac{Vin - Vo}{L}Ton \qquad \text{[Formula 1]}$$

In the Formula 1 above, Vin is the voltage across the first capacitive element C1 (i.e., first clamp value v1), Vo is the voltage across the second capacitive element C2 (i.e., second clamp value v2), and L is the inductance of the inductor L1. Ton represents the ON time of the first switch SW1 and is expressed in the following expression [Formula 2] below by using the switching cycle "T" of the first switch SW1, the duty ratio D(=Vo/Vin) of the first switch SW1, and "τ2" shown in FIG. 8.

$$Ton = T \times \frac{Vo}{Vin} - \tau 2 \qquad \text{[Formula 2]}$$

When the expression [Formula 2] is substituted into the expression [Formula 1], the expression [Formula 3] below is obtained.

$$ILp = \frac{Vin - Vo}{L}\left(T \times \frac{Vo}{Vin} - \tau 2\right) \qquad \text{[Formula 3]}$$

Figure 7A:
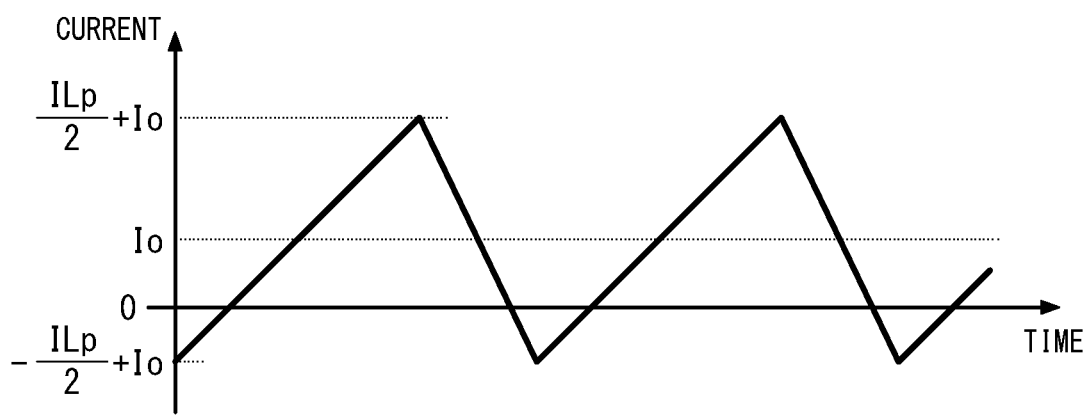
FIG. 7A is a waveform diagram illustrating the inductor current of the snubber circuit.
Figure 7B:
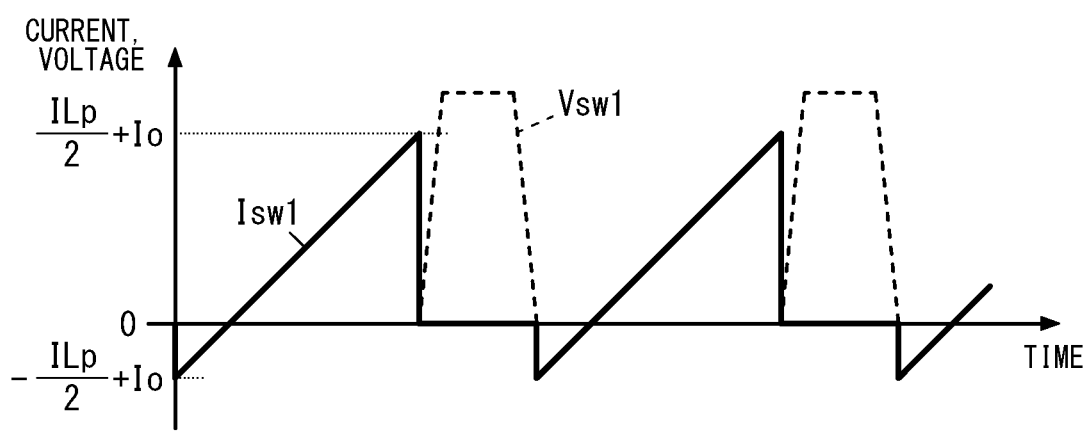
FIG. 7B is a waveform diagram illustrating the switch voltage and the switch current of the snubber circuit.

Next, a negative peak value of the inductor current IL, that is, a minimum value Imin of the inductor current IL in a case of a load current Io flowing to the snubber circuit 3 is obtained. As used herein, the term "load current Io" means an output current of the snubber circuit 3, that is, the current Id2 flowing through the second diode D2. As illustrated in FIG. 7A, the inductor current IL increases by the load current Io. FIG. 7B shows the switch current Isw1 and the switch voltage Vsw1 in this case. Thus, the minimum value Imin of the inductor current IL is expressed by a value obtained by subtracting ILp/2 from the load current Io and is expressed by the expressions [Formula 4] below.

$$Imin = Io - \frac{Vin - Vo}{2L}\left(\frac{TVo}{Vin} - \tau 2\right) \quad \text{[Formula 4]}$$

To satisfy the first condition, the minimum value Imin of the inductor current IL has to be less than zero. Thus, the inductance L of the inductor L1 has to satisfy the expression [Formula 5] below obtained by solving L of the expression [Formula 4]. That is, if the inductance L of the inductor L1 is set within a range satisfying the condition defined by the expression [Formula 5], the first condition is satisfied. Here, if the load current Io is variable, the load current Io in the expression [Formula 5] is substituted with a rated value (maximum value) of the load current Io.

$$L < \frac{Vin - Vo}{2Io}\left(\frac{TVo}{Vin} - \tau 2\right) \quad \text{[Formula 5]}$$

Figure 8:
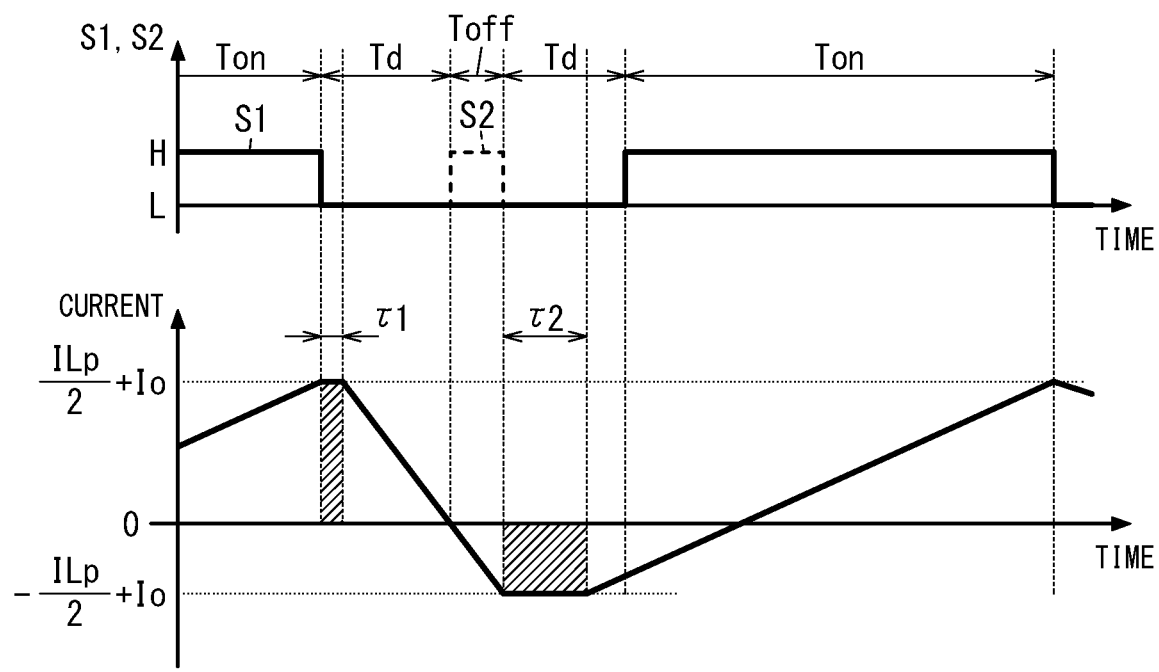
FIG. 8 is a timing chart illustrating a control signal and the inductor current of the snubber circuit.

Next, the circuit constant of the inductor L1 and the circuit constant of the capacitive element C3 for satisfying the second condition will be described. The capacitive element C3 is an element for adjusting an inversion time of the inductor current IL. As illustrated in FIG. 8, the capacitive element C3 is electrically connected in parallel to the inductor L1, thereby functioning to delay an inversion timing of the inductor current IL, that is, a start of rising of the inductor current IL. Thus, when the first switch SW1 is turned on, it is possible to control the inductor current IL to be zero or less, so that soft switching of the first switch SW1 is realizable. In FIG. 8, the control signal S1 for controlling the first switch SW1 and the control signal S2 for controlling the second switch SW2 are shown in an upper section, and the inductor current IL is shown in a lower section, where the horizontal axis is a time axis. When the control signal S1 is "H" (at a high level), the first switch SW1 is ON, and when the control signal S1 is "L" (at a low level), the first switch SW1 is OFF. Similarly, when the control signal S2 is "H", the second switch SW2 is ON, and when the control signal S2 is "L", the second switch SW2 is OFF.

Here, when the electrical energy accumulated in the capacitive element C3 is sufficiently less than the electrical energy of the inductor L1, the amount of charges released from the capacitive element C3 during the time periods τ1 and τ2 in FIG. 8 is respectively expressed by the following expressions [Formula 6] and [Formula 7]. In FIG. 8, hatched areas represent the electrical energy discharged from the capacitive element C3.

$$CVin = \tau 2 \times \left\{\frac{Vin - Vo}{2L}(DT - \tau 2) - Io\right\} \quad \text{[Formula 6]}$$

$$CVin = \tau 1 \times \left\{\frac{Vin - Vo}{2L}(DT - \tau 2) - Io\right\} \quad \text{[Formula 7]}$$

In Formulae 6 and 7, C is a capacitance value of the capacitive element C3, and D is the duty ratio of the first switch SW1. Thus, DT in the expressions is a value obtained by adding a dead time Td to an on time Ton, and DT-τ2 corresponds to a time period during which the inductor current IL increases. Here, in order to satisfy the second condition, inversion of the inductor current IL has to be completed within the dead time Td. That is, in the expressions [Formula 6] and [Formula 7], the inductance L of the inductor L1 and the capacitance value C of the capacitive element C3 have to be set such that the relationships τ1<Td and τ2<Td are satisfied. In sum, when the inductance L and the capacitance value C are set within a range satisfying the conditions τ1<Td and τ2<Td in the expressions [Formula 6] and [Formula 7], the second condition is satisfied.

Note that soft switching of the first switch SW1 of the first switch SW1 and the second switch SW2 in the snubber circuit 3 has been described, but soft switching of the second switch SW2 is also realizable in a similar manner.

(3.4) Operation Sequence of Snubber Circuit

Hereinafter, an operation sequence of the snubber circuit 3 will be described in further detail with reference to FIGS. 9 to 12C. In the following description, a voltage and a current of each component in the snubber circuit 3 are defined as indicated by arrows in FIG. 10. The (positive/negative) polarity of the voltage or the current is also defined such that the direction indicated by the arrow in FIG. 10 is the "positive" direction of the voltage or the current. Each of FIGS. 11A to 12C shows an equivalent circuit reflecting the operation of the snubber circuit 3 in a corresponding one of phases so as to describe the operation of the snubber circuit 3.

Figure 9:
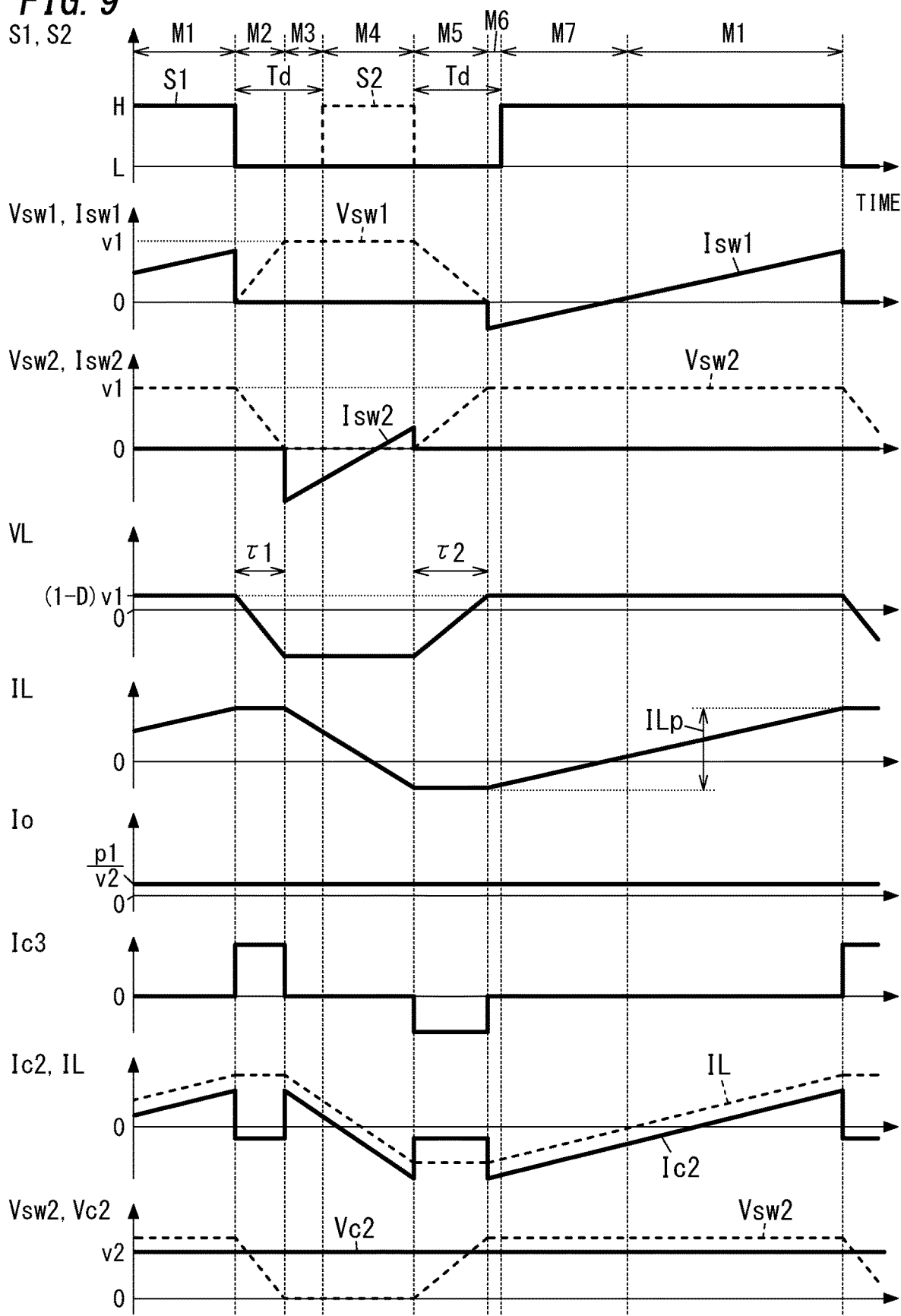
FIG. 9 is a timing chart illustrating an operation sequence of the snubber circuit.
Figure 10:
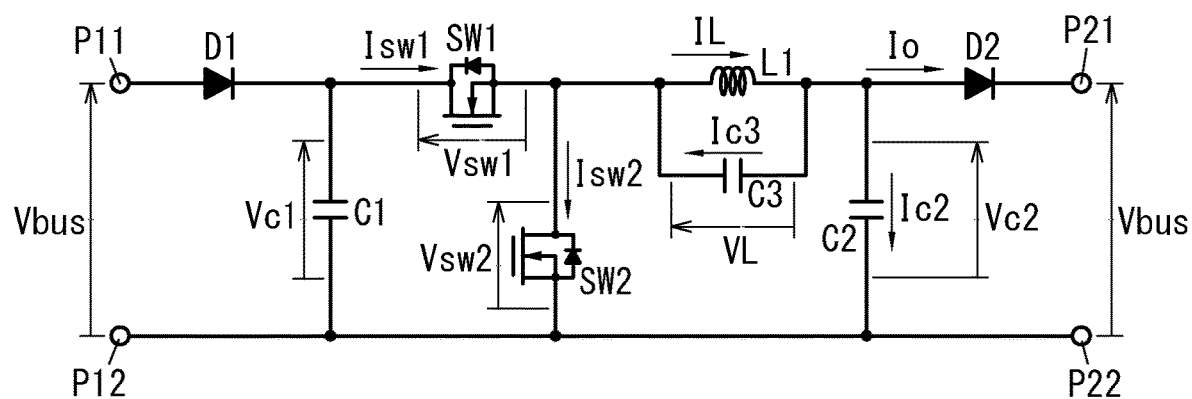
FIG. 10 is a circuit diagram illustrating the snubber circuit.

As illustrated in FIG. 9, the operation of the snubber circuit 3 is divided into seven phases, namely a first phase M1 to a seventh phase M7. In FIG. 9, the horizontal axis is a time axis, and the control signal S1 and the control signal S2 are shown in the uppermost section, the switch current Isw1 and the switch voltage Vsw1 are shown in the second section, and a switch current Isw2 and a switch voltage Vsw2 are shown in the third section. Moreover, a voltage across the inductor L1 (hereinafter referred to as an "inductor voltage VL") is shown in the fourth section, the inductor current IL is shown in the fifth section, the load current Io is shown in the sixth section, and a current Ic3 flowing through a third capacitive element C3 is shown in the seventh section. Furthermore, a current Ic2 and the inductor current IL flowing through the second capacitive element C2 are shown in the eighth section, and the second clamp voltage Vc2 and the switch voltage Vsw2 are shown in the lowermost section. Here, the control signal S1 and the control signal S2 have asymmetrical signal waveforms and the duty ratios of the control signals S1 and S2 are fixed values so that the on time length of the first switch SW1 is different from the on time length of the second switch SW2.

Figure 11A:
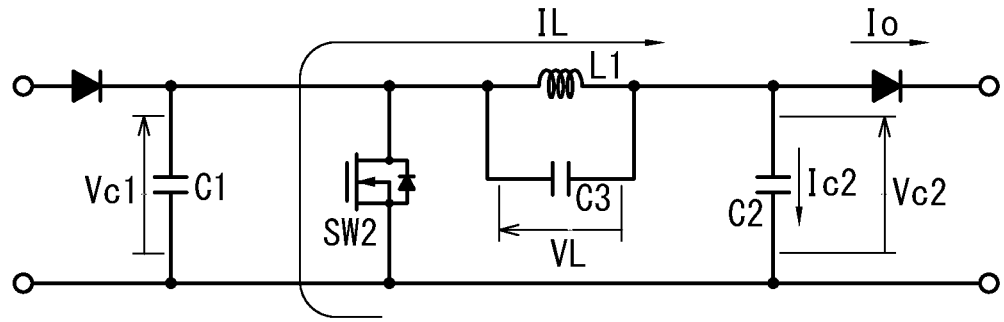
FIG. 11A is a view illustrating an equivalent circuit in a first phase of the snubber circuit.

First, in the first phase M1, the first switch SW1 is ON, and the second switch SW2 is OFF. Therefore, the snubber circuit 3 is equivalently in an operational state as illustrated in FIG. 11A. During this time period, if the capacitance value of the second capacitive element C2 is sufficiently large, and the load current Io is a direct current, the inductor voltage VL is a constant voltage to maintain a difference value (v1−v2) between the first clamp value v1 and the second clamp value v2. On the other hand, the inductor current IL linearly increases. The switch current Isw1 at this time is equal to the inductor current IL. At this time, the second capacitive element C2 is charged with the current Ic2 (=IL−Io) obtained by subtracting the load current Io from the inductor current IL.

Figure 11B:
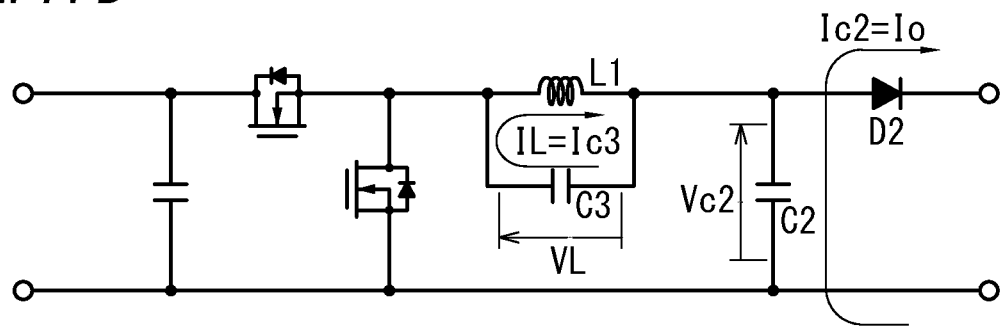
FIG. 11B is a view illustrating the equivalent circuit in a second phase of the snubber circuit.

In the second phase M2, the first switch SW1 is turned off, and the second switch SW2 remains in the OFF state, thereby transitioning to the dead time Td. Thus, the snubber circuit 3 is equivalently in the operational state as illustrated in FIG. 11B. During this time period, the inductor L1 and the third capacitive element C3 are electrically disconnected from the pair of first voltage points P11 and P12 and the pair of second voltage points P21 and P22 to configure an LC parallel resonance circuit. Here, the third capacitive element C3 is discharged, and thereby, the current Ic3 flows in a direction indicated by the arrow in FIG. 11B, and the orientation (polarity) of the inductor voltage VL is gradually inverted. At this time, the current Ic3 is equal to the inductor current IL, and the load current Io is equal to the current Ic2. Here, the third capacitive element C3 delays a rise of the switch voltage Vsw1 to avoid overlapping of the switch voltage Vsw1 and the switch current Isw1, so that soft switching is realized.

Figure 11C:
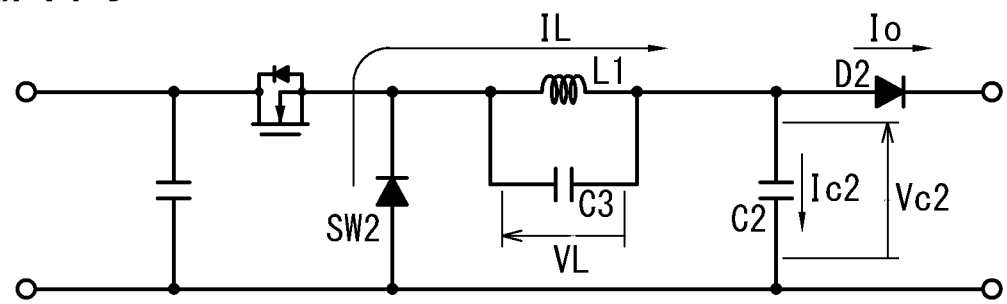
FIG. 11C is a view illustrating the equivalent circuit in a third phase of the snubber circuit.

The third phase M3 corresponds to the dead time Td after the inversion of the orientation (polarity) of the inductor voltage VL, the first switch SW1 remains in the OFF state, the second switch SW2 remains in the OFF state, and the snubber circuit 3 is equivalently in the operational state as illustrated in FIG. 11C. During this time period, a parasitic diode of the second switch SW2 is turned on, and through the parasitic diode, a return current flows in a direction indicated by the arrow in FIG. 11C. The inductor voltage VL is a constant voltage and maintains the same value as the second clamp voltage Vc2. At this time, the third capacitive element C3 is neither charged nor discharged. During this time period, the inductor current IL is expressed as a sum (IL=Io+Ic2) of the load current Io and the current Ic2, and a direct current component and a ripple component of the inductor current IL are respectively the load current Io and the current Ic2. During this time period, the switch voltage Vsw1 rises to the maximum value (first clamp value v1).

Figure 11D:
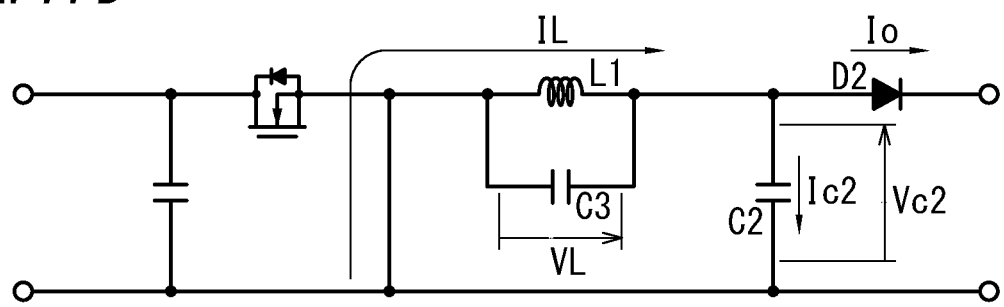
FIG. 11D is a view illustrating the equivalent circuit in a fourth phase of the snubber circuit.

In the fourth phase M4, the first switch SW1 remains in the OFF state, and the second switch SW2 is turned on. Therefore, the snubber circuit 3 is equivalently in an operational state as illustrated in FIG. 11D. Similarly to the third phase M3, also in this time period, a return current flows through the second switch SW2 for a while. In the course of this time period, the polarities of the switch current Isw2, the inductor current IL, and the current Ic2 are inverted. That is, the switch current Isw2 changes from a negative current to a positive current, the inductor current IL changes from a positive current to a negative current, and the current Ic2 changes from a positive current to a negative current. When the inductor current IL changes to a negative current, discharging of the second capacitive element C2 is started.

Figure 12A:
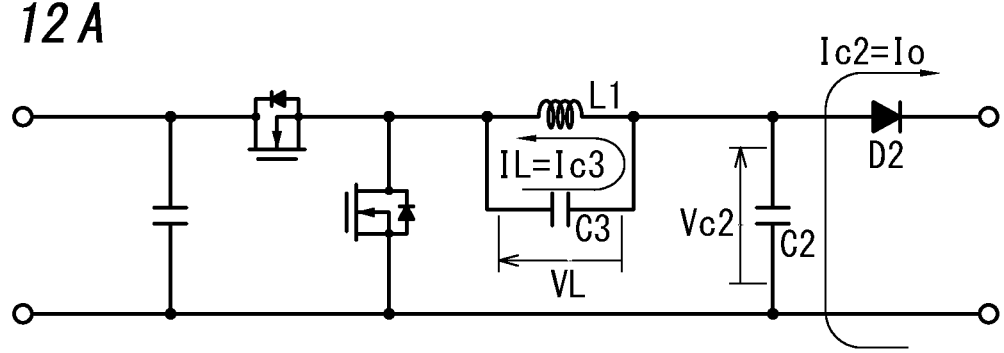
FIG. 12A is a view illustrating the equivalent circuit in a fifth phase of the snubber circuit.

In the fifth phase M5, the first switch SW1 remains in the OFF state, and the second switch SW2 is turned off, thereby transitioning to the dead time Td. Thus, the snubber circuit 3 is equivalently in the operational state as illustrated in FIG. 12A. Similarly to the second phase M2, during this time period, the inductor L1 and the third capacitive element C3 are electrically disconnected from the pair of first voltage points P11 and P12 and the pair of second voltage points P21 and P22 to configure an LC parallel resonance circuit. Here, the third capacitive element C3 is discharged, and thereby, the current Ic3 flows in a direction indicated by the arrow in FIG. 12A, and the orientation (polarity) of the inductor voltage VL is gradually inverted. At this time, the current Ic3 is equal to the inductor current IL, and the load current Io is equal to the current Ic2.

Figure 12B:
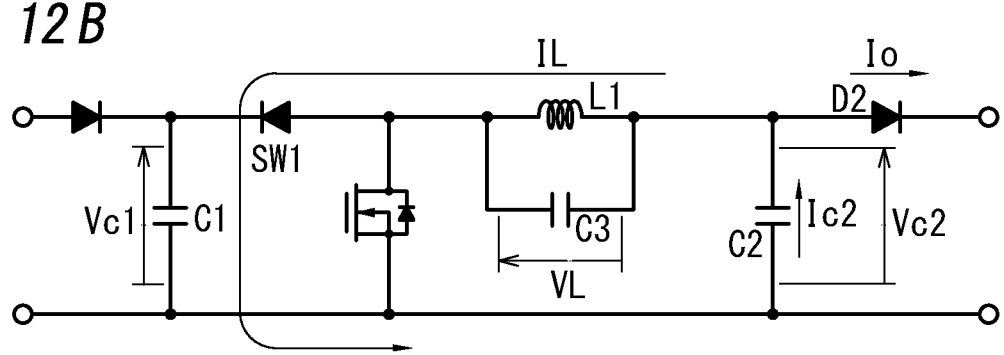
FIG. 12B is a view illustrating the equivalent circuit in a sixth phase of the snubber circuit.

The sixth phase M6 corresponds to the dead time Td after the inversion of the direction (polarity) of the inductor voltage VL, the first switch SW1 remains in the OFF state, the second switch SW2 remains in the OFF state, and the snubber circuit 3 is equivalently in the operational state as illustrated in FIG. 12B. During this time period, a parasitic diode of the first switch SW1 is turned on, and through the parasitic diode, the inductor current IL is regenerated in the first capacitive element C1.

Figure 12C:
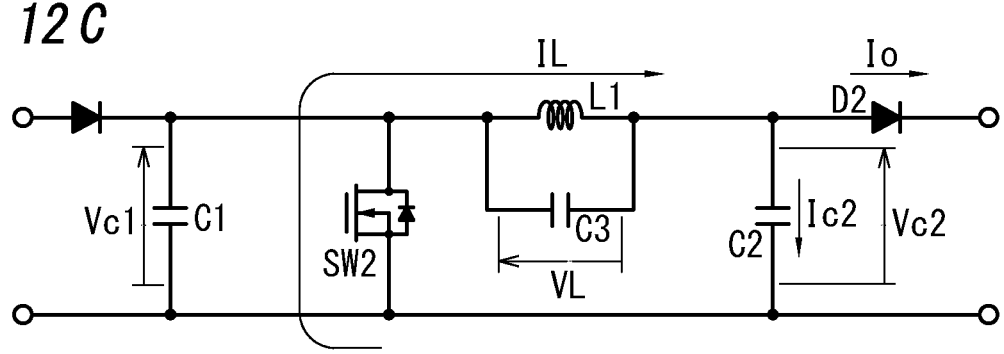
FIG. 12C is a view illustrating the equivalent circuit in a seventh phase of the snubber circuit.

In the seventh phase M7, the first switch SW1 is turned on, and the second switch SW2 remains in the OFF state. Therefore, the snubber circuit 3 is equivalently in an operational state as illustrated in FIG. 12C. During this time period, the switch current Isw1 is equal to the inductor current IL, but subsequently to the sixth phase M6, the inductor current IL is regenerated in the first capacitive element C1. At this time, the polarity of the switch current Isw1 is negative, and the parasitic diode of the first switch SW1 is conductive when the switch voltage Vsw1 falls, and therefore, switching loss is reduced.

(4) Variation

The above-mentioned embodiment is a mere example of the present disclosure. The present disclosure is not limited to the above-mentioned embodiment, but as embodiments other than the above-mentioned embodiment, various modifications may be made depending on design and the like without departing from the scope of technical ideas of the present disclosure. Variations of the embodiment will be described below.

The power storage system including the power conversion system 1 and the storage battery 5 is not limited to the use in non-dwelling facilities but may be introduced into, for example, dwelling houses or may be applied to objects such as an electric vehicle other than facilities. Moreover, the power conversion system 1 is not limited to the use for electric power conversion between the power system 4 and the storage battery 5 but may be used for electric power conversion between a power generating facility such as a photovoltaic generator or a fuel cell and a power system 4 or a load.

Moreover, the power conversion system 1 is not limited to a configuration for bidirectionally converting electric power but may be configured to only unidirectionally convert electric power, for example, from the pair of primary-side terminals T11 and T12 to the pair of secondary-side terminals T21 and T22.

Moreover, in the voltage conversion circuit 33 of the snubber circuit 3, the second switch SW2 is not limited to the MOSFET but may be, for example, a diode. In this case, the second switch SW2 is provided in the same direction as a parasitic diode of the MOSFET, that is, is connected such that the cathode is connected to the source of the first switch SW1 and the anode is connected to the first voltage point P12 on the low-potential side.

Moreover, the second clamp circuit 32 may regenerate electrical energy absorbed from the pair of first voltage points P11 and P12 of the main circuit 2 by the first clamp circuit 31 from a location electrically different from the pair of first voltage points P11 and P12 in the main circuit 2. In this case, the voltage conversion circuit 33 is not limited to the step-down circuit configured to step-down the first clamp voltage Vc1 to generate the second clamp voltage Vc2 but may be, for example, a step-up circuit configured to step-up the first clamp voltage Vc1 to generate the second clamp voltage Vc2.

Moreover, it is not essential that the capacitive element C3 is electrically connected in parallel to the inductor L1, but it is required only that the capacitive element C3 is electrically connected in parallel at least to one of the first switch SW1 and the inductor L1. That is, the capacitive element C3 may be electrically connected in parallel to the first switch SW1 or may be electrically connected in parallel to both the first switch SW1 and the inductor L1.

Moreover, the first diode D1 is not limited to the configuration as described in the embodiment in which the first diode D1 is electrically connected to the first voltage point P11 of the pair of first voltage points P11 and P12 which is located on the high-potential side. The first diode D1 may be electrically connected to the first voltage point P12 on the low-potential side. Similarly, the second diode D2 may be electrically connected to the second voltage point P22 of the pair of second voltage points P21 and P22 which is located on the low-potential side. Moreover, the first diode D1 and the second diode D2 may be, for example, parasitic diodes of a MOSFET.

Moreover, each of the first to eighth switching elements Q11 to Q18 includes a parasitic diode of a MOSFET, but separately from the parasitic diode, a diode may be electrically connected antiparallel to each of the first to eighth switching elements Q11 to Q18. Moreover, each of the first to eighth switching elements Q11 to Q18 is not limited to a MOSFET but may be, for example, an Insulated Gate Bipolar Transistor (IGBT).

Moreover, the RC snubber 23 is not a component essential for the power conversion system 1 (main circuit 2). Thus, the RC snubber 23 may accordingly be omitted.

Moreover, the first clamp voltage Vc1 is at least a voltage defining the first clamp value v1, it is not essential that the magnitude of the first clamp voltage Vc1 corresponds to the first clamp value v1, and for example, the magnitude of the voltage obtained by dividing the first clamp voltage Vc1 may correspond to the first clamp value v1. Similarly, the second clamp voltage Vc2 is at least a voltage defining the second clamp value v2.

Moreover, in the embodiment, a case where the power system 4 corresponds to single-phase electric power has been described, but this should not be construed as limiting. The power system 4 may correspond to, for example, three-phase electric power. In the case of the three-phase electric power, the main circuit 2 preferably includes three primary-side terminals and three secondary-side terminals.

(5) Summary

As described above, a snubber circuit 3 of a first aspect includes a first clamp circuit 31, a second clamp circuit 32, and a voltage conversion circuit 33. The first clamp circuit 31 is configured to, when a magnitude of a voltage between a pair of first voltage points P11 and P12 in a main circuit 2 exceeds a first clamp value v1, absorb electrical energy of the main circuit 2 from the pair of first voltage points P11 and P12. Thus, the first clamp circuit 31 clamps the voltage between the pair of first voltage points P11 and P12 to the first clamp value v1. The second clamp circuit 32 is configured to, when a magnitude of a voltage between a pair of second voltage points P21 and P22 in the main circuit 2 falls below a second clamp value v2, inject electrical energy to the main circuit 2 from the pair of second voltage points P21 and P22. Thus, the second clamp circuit 32 clamps the voltage between the pair of second voltage points P21 and P22 to the second clamp value v2. The voltage conversion circuit 33 is electrically connected to the first clamp circuit 31 and the second clamp circuit 32 and is configured to perform voltage conversion between a first clamp voltage Vc1 and a second clamp voltage Vc2. The first clamp voltage Vc1 defines the first clamp value v1. The second clamp voltage Vc2 defines the second clamp value v2.

With this configuration, when positive ringing occurs in a voltage (Vbus) between the pair of first voltage points P11 and P12, the snubber circuit 3 absorbs electrical energy of the main circuit 2 by using the first clamp circuit 31 to clamp the bus voltage Vbus to the first clamp value v1. Moreover, when negative ringing occurs in a voltage (Vbus) between the pair of second voltage points P21 and P22, the snubber circuit 3 injects electrical energy to the main circuit 2 by using the second clamp circuit 32 to clamp the bus voltage Vbus to the second clamp value v2. Moreover, the voltage conversion circuit 33 performs voltage conversion between the first clamp voltage Vc1 defining the first clamp value v1 and the second clamp voltage Vc2 defining the second clamp value v2. That is, the snubber circuit 3 regenerates electrical energy absorbed from the main circuit 2 by using the first clamp circuit 31 at the occurrence of the positive ringing from the second clamp circuit 32 in the main circuit 2 at the occurrence of the negative ringing. Thus, the snubber circuit 3 more effectively uses electrical energy than an RCD snubber circuit configured to convert absorbed energy into heat for consumption, and thus, it is possible to suppress loss at the snubber circuit 3 to a low level.

Moreover, the snubber circuit 3 regenerates electrical energy only when the voltage between the pair of first voltage points P11 and P12 exceeds the first clamp value v1 and when the voltage between the pair of second voltage points P21 and P22 falls below the second clamp value v2. Thus, the snubber circuit 3 enables only a ringing component to be regenerated without regeneration of a normal voltage (bus voltage Vbus) applied between the pair of first voltage points P11 and P12 or between the pair of second voltage points P21 and P22. Thus, the snubber circuit 3 enables influence over operation of the main circuit 2 to be suppressed to a relatively low level.

Moreover, when a voltage conversion circuit 33 which is of non-insulating type is adopted, the snubber circuit 3 does not have to have a transformer, so that simplification of the configuration and a reduction of loss of the snubber circuit 3 are possible. Moreover, when an autonomous control circuit 34 is adopted for controlling the voltage conversion circuit 33, it is possible to suppress the circuit dimension of the snubber circuit 3 to a small dimension.

In a snubber circuit 3 of a second aspect referring to the first aspect, the first voltage point P11 of the pair of first voltage points P11 and P12 is located on a high-potential side, the second voltage point P21 of the pair of second voltage points P21 and P22 is located on the high-potential side, and a potential at the first voltage point P11 is preferably equal to a potential at the second voltage point P21. In this case, the first voltage point P12 of the pair of first voltage points P11 and P12 is located on a low-potential side, the second voltage point P22 of the pair of second voltage points P21 and P22 is located on the low-potential side, and a potential at the first voltage point P12 is preferably equal to a potential at the second voltage point P22. The voltage conversion circuit 33 is preferably configured to step down the first clamp voltage Vc1 to generate the second clamp voltage Vc2. This configuration enables the second clamp circuit 32 to regenerate electrical energy absorbed from the pair of first voltage points P11 and P12 of the main circuit 2 by the first clamp circuit 31 from a location electrically equivalent to the pair of first voltage points P11 and P12 in the main circuit 2. Thus, the snubber circuit 3 is applicable to the main circuit 2 configured to bidirectionally convert electric power.

In a snubber circuit 3 of a third aspect referring to the first or second aspect, the voltage conversion circuit 33 is preferably a DC/DC converter including a semiconductor switch (first switch SW1), an inductor L1, and a capacitive element C3. In this case, the capacitive element C3 is preferably electrically connected in parallel to at least one of the semiconductor switch and the inductor L1. This configuration enables soft switching of a semiconductor switch in the voltage conversion circuit 33 to be realized and ringing and loss occurring in the snubber circuit 3 to be suppressed to a low level. Note that this configuration is not an essential configuration of the snubber circuit 3, and the capacitive element C3 may accordingly be omitted.

In a snubber circuit of a fourth aspect referring to any one of the first to third aspects, the first clamp circuit 31 preferably includes a first diode D1 and a first capacitive element C1 which are electrically connected in series between the pair of first voltage points P11 and P12. In this case, the first clamp circuit 31 is preferably configured to, when the voltage between the pair of first voltage points P11 and P12 exceeds the first clamp value v1, cause a current to flow from the main circuit 2 through the first diode D1 to the first capacitive element C1. The second clamp circuit 32 includes a second diode D2 and a second capacitive element C2 which are electrically connected in series between the pair of second voltage points P21 and P22. In this case, the second clamp circuit 32 is preferably configured to, when the voltage between the pair of second voltage points P21 and P22 falls below the second clamp value v2, cause a current to flow from the second capacitive element C2 through the second diode D2 to the main circuit 2. With this configuration, a relatively simple circuit configuration including a diode and a capacitive element (capacitor, or the like) realizes the first clamp circuit 31 and the second clamp circuit 32.

In a snubber circuit 3 of a fifth aspect referring to any one of the first to fourth aspects, the voltage conversion circuit 33 is preferably a DC/DC converter including a semiconductor switch (first switch SW1) and an inductor L1. In this case, the voltage conversion circuit 33 is preferably configured to cause the semiconductor switch to perform switching operation such that an inductor current IL flowing through the inductor L1 is in a discontinuous mode. This configuration enables soft switching of a semiconductor switch in the voltage conversion circuit 33 to be realized and ringing and loss occurring in the snubber circuit 3 to be suppressed to a low level. Note that this configuration is not an essential configuration of the snubber circuit 3, and the voltage conversion circuit 33 may cause a semiconductor switch to perform switching operation such that the inductor current IL flowing through the inductor L1 is in a critical mode or a continuous mode.

In a snubber circuit 3 of a sixth aspect referring to any one of the first to fifth aspects, the voltage conversion circuit 33 is preferably a DC/DC converter including a semiconductor switch (first switch SW1), an inductor L1, and a control circuit 34 configured to control the semiconductor switch. In this case, the control circuit 34 is preferably configured to adjust a duty ratio of the semiconductor switch to adjust the first clamp value v1 and the second clamp value v2. With this configuration, adjusting the duty ratio of the semiconductor switch enables the first clamp value v1 and the second clamp value v2 to be set to arbitrary values. Note that this configuration is not an essential configuration of the snubber circuit 3, and the duty ratio of the semiconductor switch may be fixed.

A power conversion system 1 of a seventh aspect includes the snubber circuit 3 of any one of the first to sixth aspects, and a main circuit 2, wherein the main circuit 2 is a power conversion circuit configured to convert electric power. With this configuration, the snubber circuit 3 more effectively uses electrical energy than an RCD snubber circuit, and thus, it is possible to suppress loss at the snubber circuit 3 to a low level. As a result, the loss in the snubber circuit 3 in the power conversion system 1 is reduced to a low level, and as the entirety of the power conversion system 1, it is possible to improve the conversion efficiency of the electric power. In particular, when the main circuit 2 performs electric power conversion of relatively large electric power, heat generation by the snubber circuit 3 is reduced, which also leads to downsizing and simplification of the heat dissipation structure of the snubber circuit 3.

In a power conversion system 1 of an eighth aspect of the seventh aspect, the main circuit 2 preferably includes two or more primary-side terminals T11 and T12, two or more secondary-side terminals T21 and T22, and a high-frequency insulated transformer (transformer 26). In this case, the main circuit 2 is preferably configured to convert electric power between a set of the two or more primary-side terminals T11 and T12 and a set of the two or more secondary-side terminals T21 and T22 via the high-frequency insulated transformer. With this configuration, the power conversion system 1 may adopt an insulating-type circuit configuration.

In a power conversion system 1 of a ninth aspect referring to the eighth aspect, the snubber circuit 3 is preferably electrically connected to the high-frequency insulated transformer (transformer 26). With this configuration, ringing occurring due to leakage inductance of the high-frequency insulated transformer can be controlled by the snubber circuit 3.

REFERENCE SIGNS LIST

1 POWER CONVERSION SYSTEM
2 MAIN CIRCUIT
26 TRANSFORMER (HIGH-FREQUENCY INSULATED TRANSFORMER)
3 SNUBBER CIRCUIT
31 FIRST CLAMP CIRCUIT
32 SECOND CLAMP CIRCUIT
33 VOLTAGE CONVERSION CIRCUIT
34 CONTROL CIRCUIT
C1 FIRST CAPACITIVE ELEMENT
C2 SECOND CAPACITIVE ELEMENT
C3 CAPACITIVE ELEMENT
D1 FIRST DIODE
D2 SECOND DIODE
L1 INDUCTOR
P11, P12 FIRST VOLTAGE POINT
P21, P22 SECOND VOLTAGE POINT
SW1 FIRST SWITCH (SEMICONDUCTOR SWITCH)
T11, T12 PRIMARY-SIDE TERMINAL
T21, T22 SECONDARY-SIDE TERMINAL
Vc1 FIRST CLAMP VOLTAGE
v1 FIRST CLAMP VALUE
Vc2 SECOND CLAMP VOLTAGE
v2 SECOND CLAMP VALUE

The invention claimed is:
1. A snubber circuit comprising:
a first clamp circuit configured to, when a magnitude of a voltage between a pair of first voltage points in a main circuit exceeds a first clamp value, absorb electrical energy of the main circuit from the pair of first voltage points to clamp the voltage between the pair of the first voltage points to the first clamp value;
a second clamp circuit configured to, when a magnitude of a voltage between a pair of second voltage points in the main circuit falls below a second clamp value, inject electrical energy to the main circuit from the pair of second voltage points to clamp the voltage between the pair of the second voltage points to the second clamp value; and a voltage conversion circuit electrically connected to the first clamp circuit and the second clamp circuit and configured to perform voltage conversion between a first clamp voltage and a second clamp voltage, the first clamp voltage defining the first clamp value, the second clamp voltage defining the second clamp value, wherein one first voltage point of the pair of first voltage points is located on a high-potential side, one second voltage point of the pair of second voltage points is located on the high-potential side, and a potential at the one first voltage point is equal to a potential at the one second voltage point, and the other first voltage point of the pair of first voltage points is located on a low-potential side, the other second voltage point of the pair of second voltage points is located on the low-potential side, and a potential at the other first voltage point is equal to a potential at the other second voltage point.

2. The snubber circuit of claim 1, wherein
the voltage conversion circuit is a DC/DC converter including
a semiconductor switch,
an inductor, and
a capacitive element electrically connected in parallel to at least one of the semiconductor switch and the inductor.

3. The snubber circuit of claim 1, wherein
the first clamp circuit includes a first diode and a first capacitive element which are electrically connected in series between the pair of first voltage points, the first clamp circuit is configured to, when the voltage between the pair of first voltage points exceeds the first clamp value, cause a current to flow from the main circuit through the first diode to the first capacitive element, the second clamp circuit includes a second diode and a second capacitive element which are electrically connected in series between the pair of second voltage points, the second clamp circuit is configured to, when the voltage between the pair of second voltage points falls below the second clamp value, cause a current to flow from the second capacitive element through the second diode to the main circuit.

4. The snubber circuit of any claim 1, wherein
the voltage conversion circuit is a DC/DC converter including
a semiconductor switch, and
an inductor, and
the voltage conversion circuit is configured to cause the semiconductor switch to perform switching operation such that an inductor current flowing through the inductor is in a discontinuous mode.

5. The snubber circuit of claim 1, wherein
the voltage conversion circuit is a DC/DC converter including
a semiconductor switch,
an inductor, and
a control circuit configured to control the semiconductor switch,
the control circuit is configured to adjust a duty ratio of the semiconductor switch to adjust the first clamp value and the second clamp value.

6. A power conversion system, comprising:
the snubber circuit of claim 1; and
the main circuit,
the main circuit being a power conversion circuit configured to convert electric power.

7. The power conversion system of claim 6, wherein
the main circuit includes
two or more primary-side terminals,
two or more secondary-side terminals, and
a high-frequency insulated transformer, and
the main circuit is configured to convert electric power between a set of the two or more primary-side terminals and a set of the two or more secondary-side terminals via the high-frequency insulated transformer.

8. The power conversion system of claim 7, wherein the snubber circuit is electrically connected to the high-frequency insulated transformer.

9. The snubber circuit of claim 1, wherein the first clamp voltage is higher than the second clamp voltage.

10. The snubber circuit of claim 9, wherein
the voltage conversion circuit is configured to step down the first clamp voltage to generate the second clamp voltage.

* * * * *